United States Patent
Parker et al.

(10) Patent No.: US 11,914,264 B2
(45) Date of Patent: Feb. 27, 2024

(54) HYBRID PHOTONIC RING MODULATORS

(71) Applicant: OpenLight Photonics, Inc., Goleta, CA (US)

(72) Inventors: John Parker, Goleta, CA (US); Jonathan Edgar Roth, Sunnyvale, CA (US); Gregory Alan Fish, Santa Barbara, CA (US)

(73) Assignee: OpenLight Photonics, Inc., Goleta, CA (US)

( * ) Notice: Subject to any disclaimer, the term of this patent is extended or adjusted under 35 U.S.C. 154(b) by 300 days.

(21) Appl. No.: 17/065,118

(22) Filed: Oct. 7, 2020

(65) Prior Publication Data
US 2022/0107542 A1  Apr. 7, 2022

(51) Int. Cl.
| G02F 1/025 | (2006.01) |
| G02F 1/225 | (2006.01) |
| G02F 1/313 | (2006.01) |
| G02F 1/01  | (2006.01) |

(52) U.S. Cl.
CPC .......... *G02F 1/2257* (2013.01); *G02F 1/0147* (2013.01); *G02F 1/025* (2013.01); *G02F 1/3135* (2021.01); *G02F 2203/15* (2013.01)

(58) Field of Classification Search
CPC ...... G02F 1/2257; G02F 1/0147; G02F 1/025; G02F 1/3135; G02F 2203/15
USPC .......................................................... 385/1–3
See application file for complete search history.

(56) References Cited

U.S. PATENT DOCUMENTS

| 9,831,360 B2 * | 11/2017 | Knights ............ H01L 31/02327 |
| 9,893,487 B2 * | 2/2018  | Cao ........................ G02F 1/011 |
| 10,215,925 B1 * | 2/2019 | Knights ................. G02B 6/287 |
| 2010/0200733 A1 * | 8/2010 | McLaren .............. G02F 1/3132 385/14 |
| 2011/0042647 A1 | 2/2011 | Choi |
| 2012/0243828 A1 * | 9/2012 | Suzuki ............... G02B 6/12007 385/32 |

(Continued)

FOREIGN PATENT DOCUMENTS

| CN | 103487406 | 1/2014 |
| EP | 3657555 | 5/2020 |

(Continued)

OTHER PUBLICATIONS

"A 400 GB/s O-band WDM (8×50 GB/s) Silicon Photonic Ring Modulator-based Transceiver" by Pitris et al., Optical Fiber Communication Conference, paper M4H.3, Mar. 8-12, 2020.*

(Continued)

*Primary Examiner* — Robert Tavlykaev
(74) *Attorney, Agent, or Firm* — Schwegman Lundberg & Woessner, P.A.

(57) ABSTRACT

Photonic ring modulators with high tuning efficiency and small footprint can be formed in a hybrid material platform from a silicon bus waveguide vertically coupled to an optically active compound semiconductor (e.g., III-V) ring resonator. The performance of the modulator, e.g., in terms of the tuning efficiency and the maximum insertion loss, may be optimized by suitable levels of an applied bias voltage and a heater power of a heater optionally included in the ring modulator. The disclosed hybrid photonic ring modulators may be used, e.g., in photonic transceiver circuits with high lane count.

16 Claims, 19 Drawing Sheets

(56) References Cited

U.S. PATENT DOCUMENTS

| | | | |
|---|---|---|---|
| 2013/0037692 A1* | 2/2013 | Akiyama | G02F 1/0147 250/201.1 |
| 2014/0321848 A1 | 10/2014 | Sekiguchi | |
| 2017/0010485 A1* | 1/2017 | Amberg | G02F 1/0121 |
| 2017/0261692 A1* | 9/2017 | Knights | G02B 6/29395 |

FOREIGN PATENT DOCUMENTS

| | | | |
|---|---|---|---|
| JP | 2010535356 A | 11/2010 | |
| JP | 2010535420 A | 11/2010 | |
| JP | 2013207249 A | 10/2013 | |
| JP | 2014228694 A | 12/2014 | |
| JP | 2015041070 A | 3/2015 | |
| JP | 2015176069 A | 10/2015 | |
| JP | 2017015891 A | 1/2017 | |
| TW | 201626013 A | 7/2016 | |
| TW | 201737642 A | 10/2017 | |
| WO | WO-2013051095 A1 | 4/2013 | |
| WO | WO-2013114578 A1 | 8/2013 | |

OTHER PUBLICATIONS

"European Application Serial No. 20216671.6, Extended European Search Report dated Jun. 8, 2021", 9 pgs.

"Japanese Application Serial No. 2020-201603, Notification of Reasons for Rejection dated Dec. 19, 2023", With English machine translation, 19 pgs.

"Taiwanese Application Serial No. 109144178, Office Action dated Dec. 29, 2023", With English machine translation, 10 pgs.

* cited by examiner

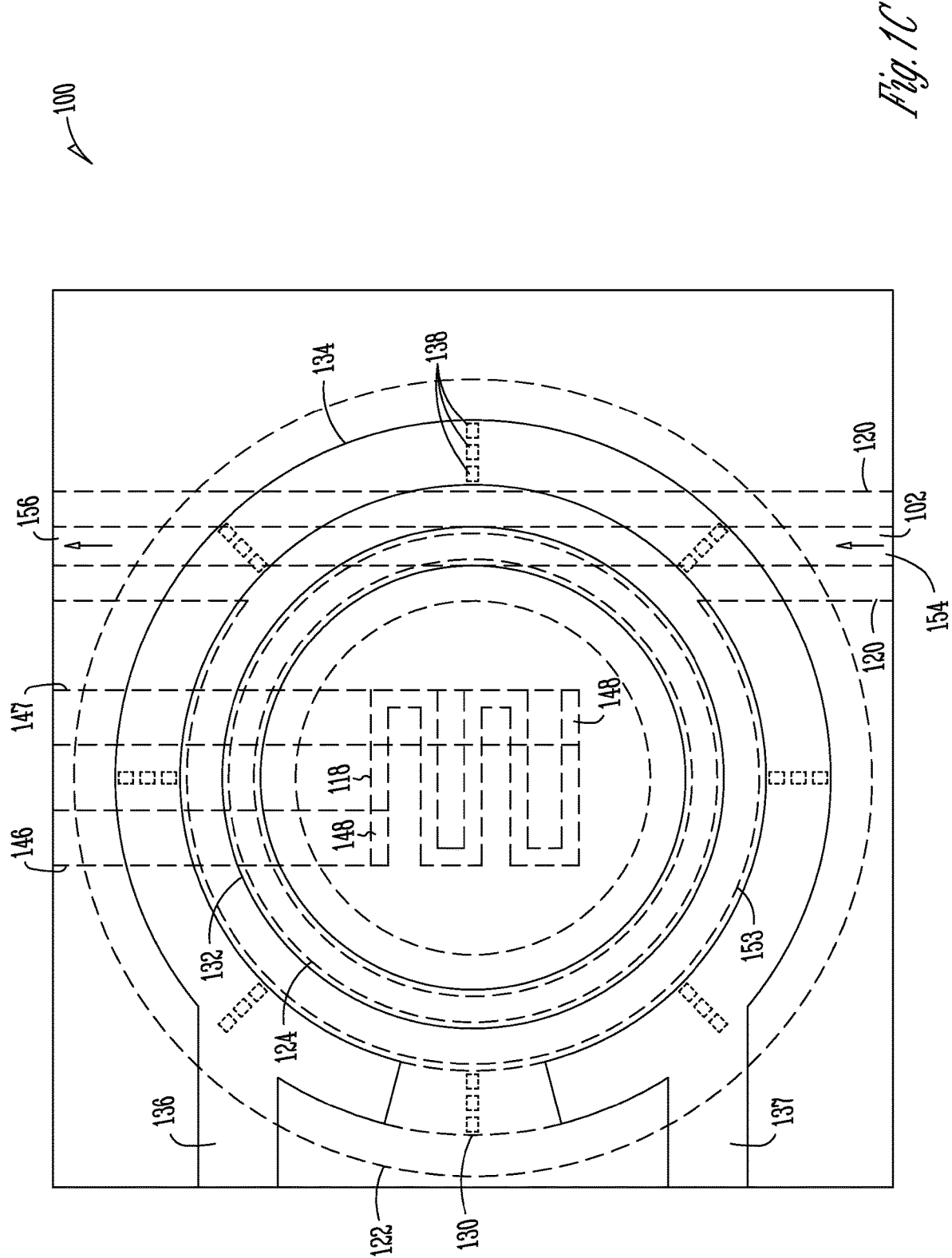

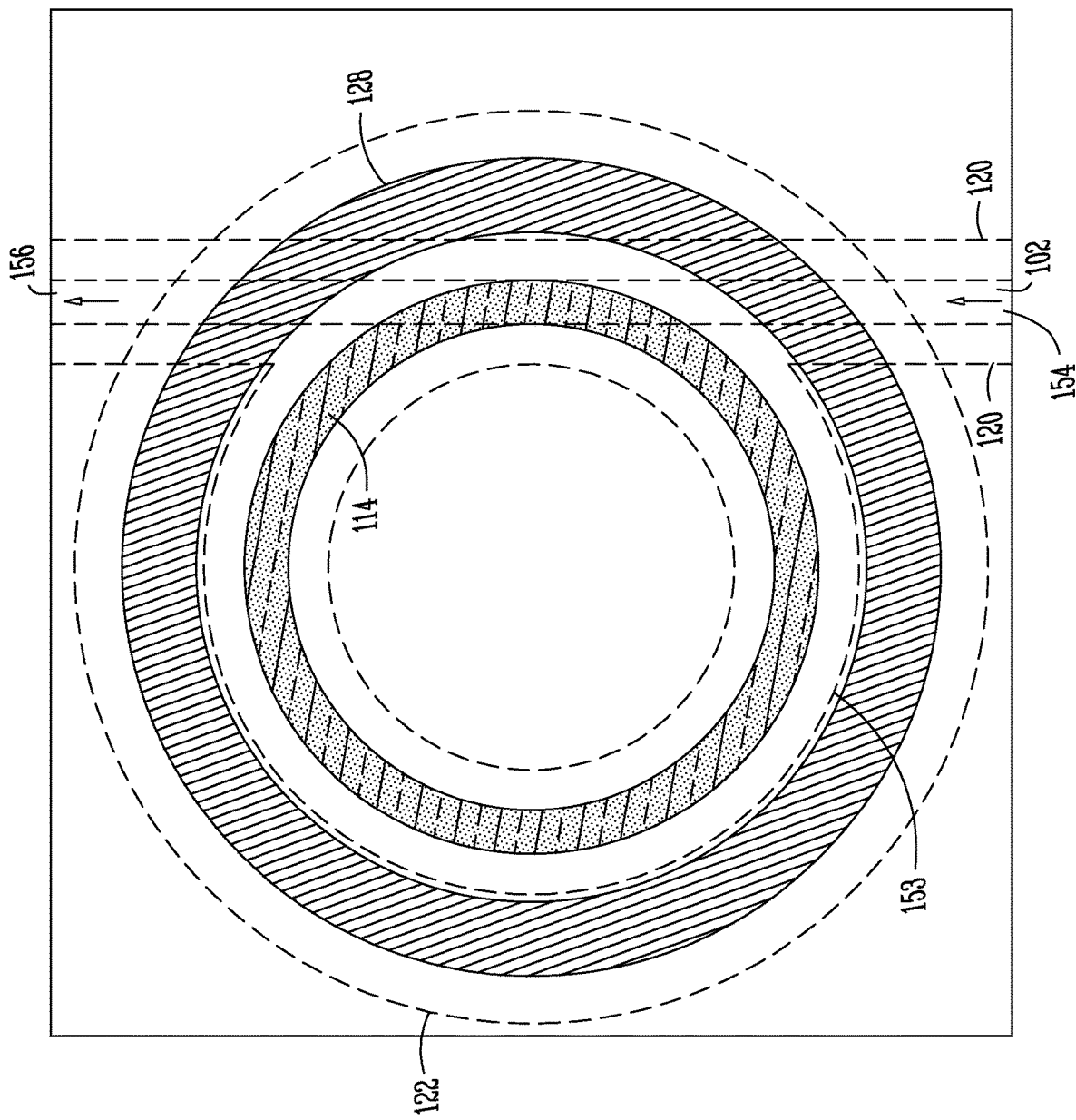

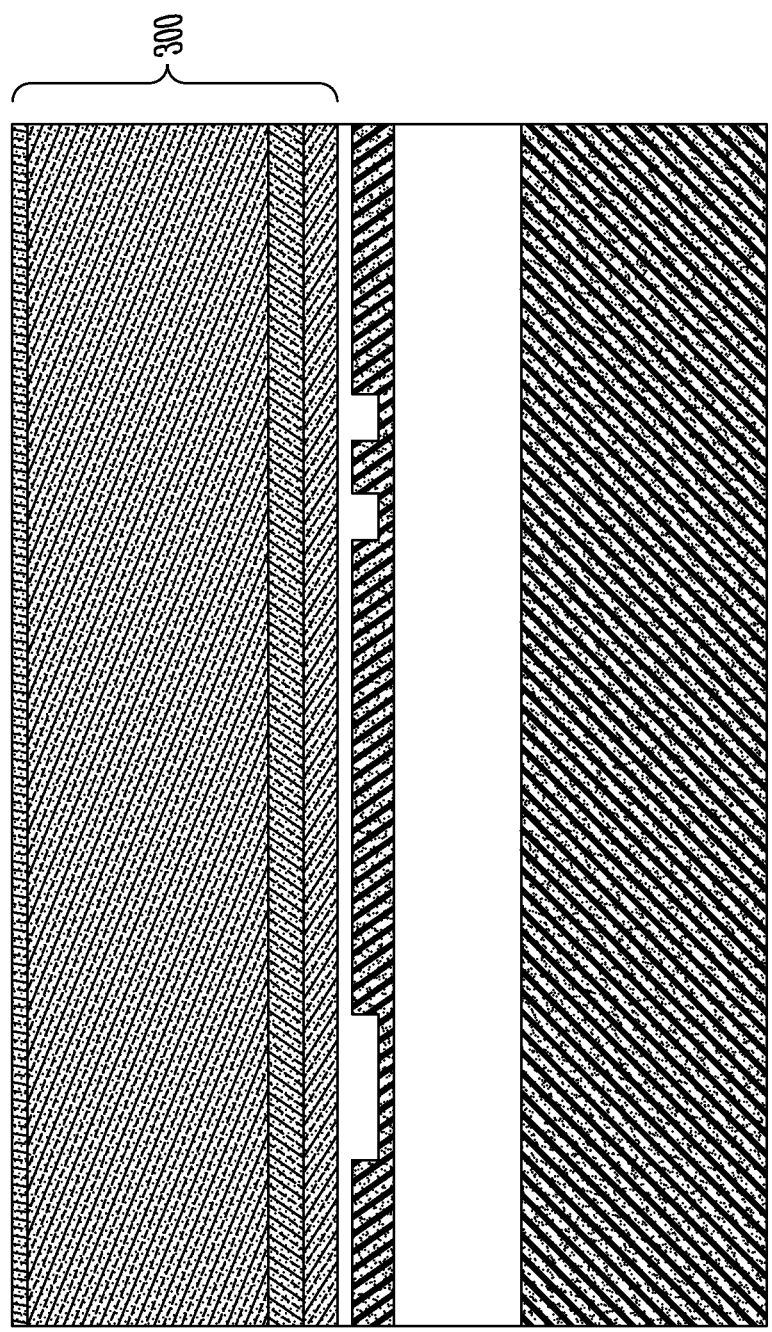

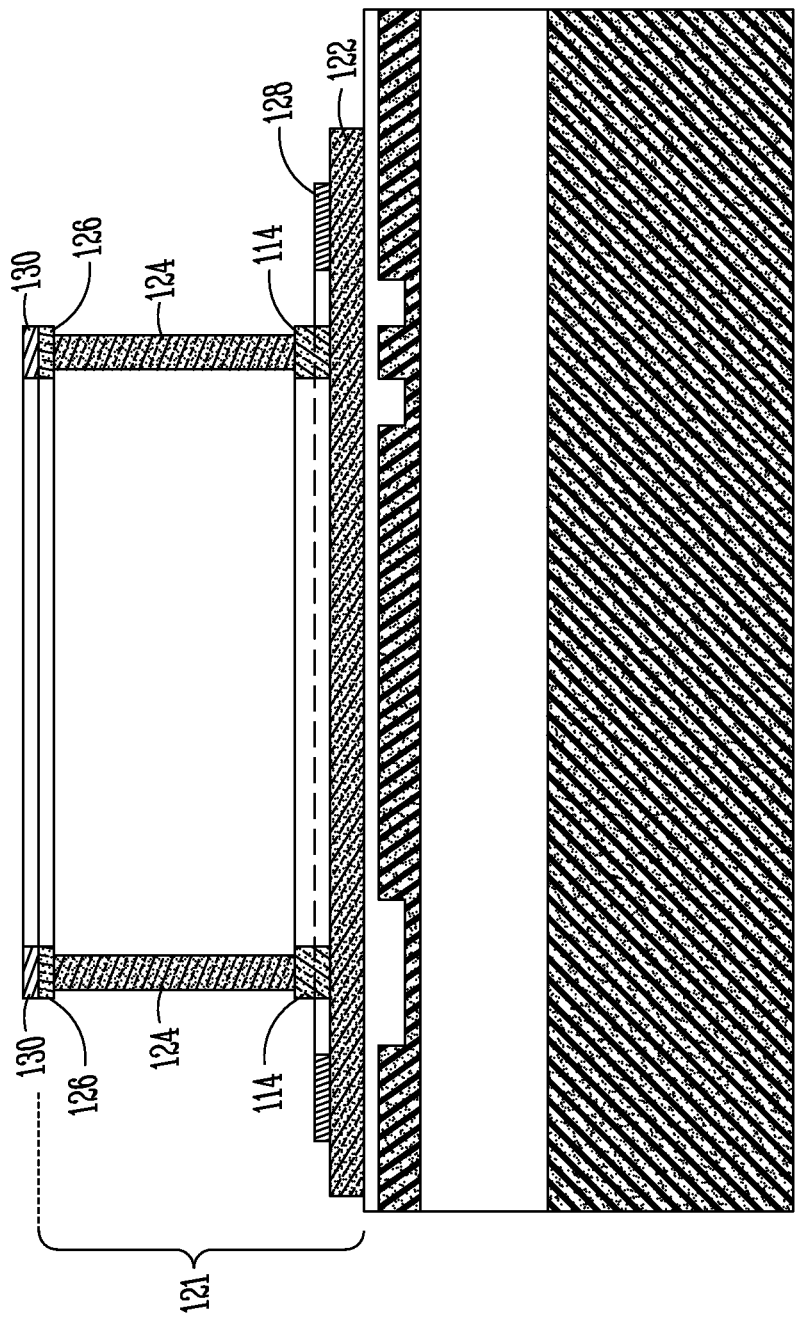

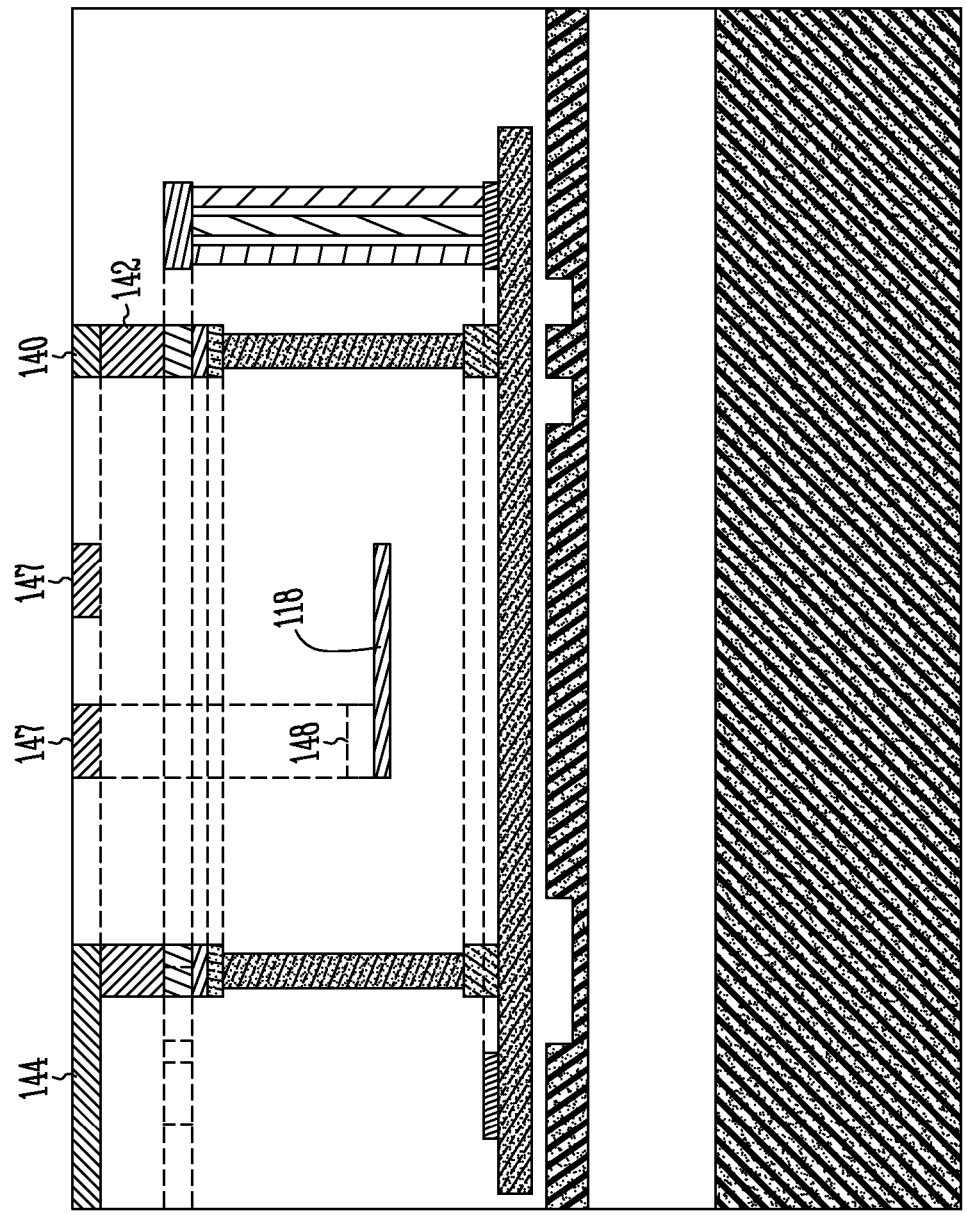

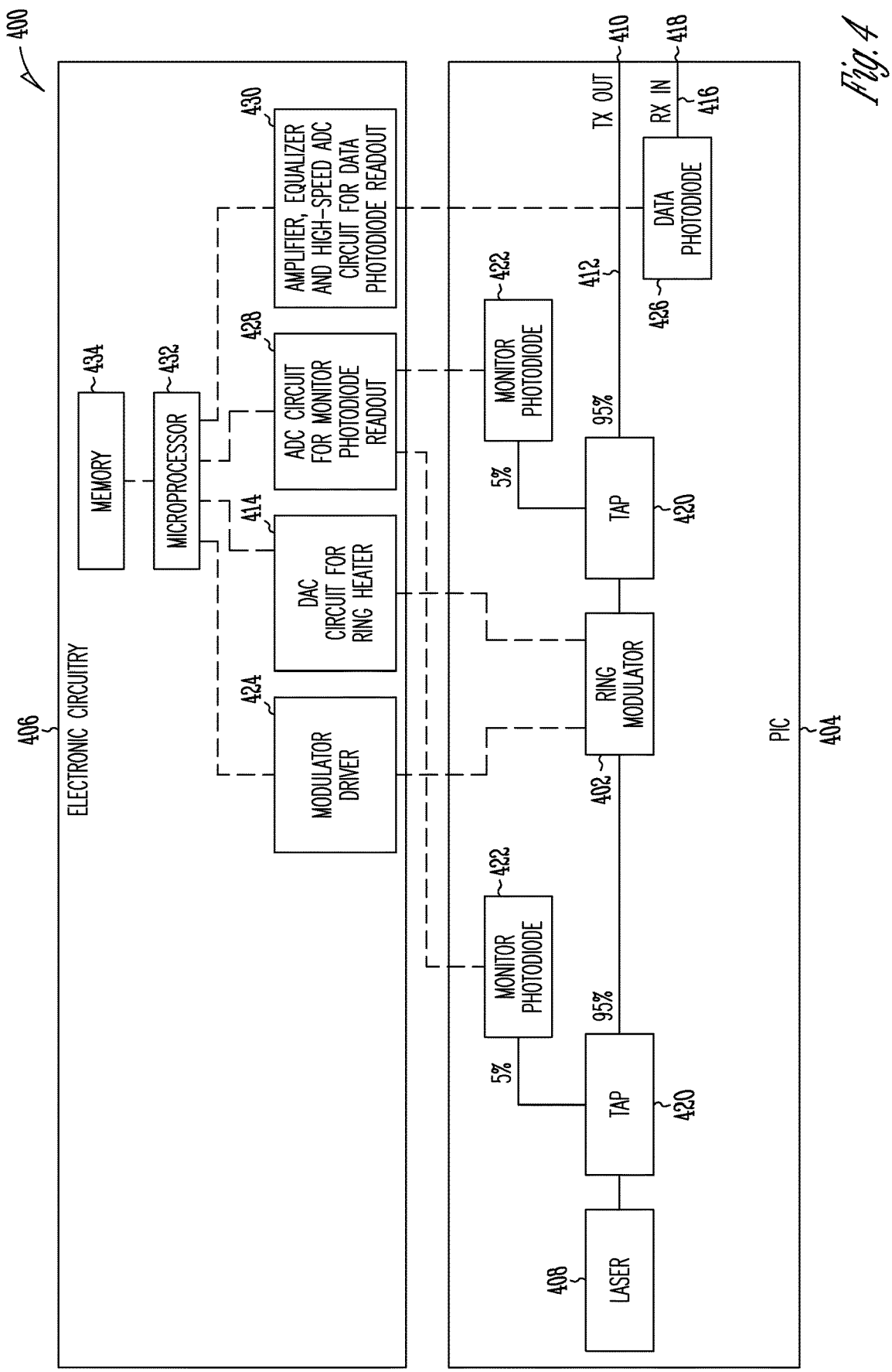

HYBRID PHOTONIC RING MODULATORS

TECHNICAL FIELD

This disclosure relates to optical modulators for photonic integrated circuits (PICs), and to associated methods of manufacture, calibration, and operation.

BACKGROUND

Many PICs employ integrated optical (or, synonymously, photonic) modulators to convert electrical signals to optical signals. Photonic transceivers, for example, can use optical modulators to impart high-speed digital data onto laser carrier signals for transmission via fiber-optic cables. In silicon photonics, an optical modulator can be implemented directly in the silicon device layer (e.g., of a silicon-on-insulator (SOI) substrate) as a Mach-Zehnder modulator, where an electro-optically or thermo-optically induced phase shift in one of the Mach-Zehnder interferometer arms achieves the amplitude modulation of the optical signal. Alternatively, in hybrid material platforms including a compound semiconductor (e.g., III-V) layer above the silicon device layer, light can be coupled between the silicon device layer and a compound-semiconductor electro-absorption modulator that effects the optical amplitude modulation by wavelength-shifting an absorption edge. Both of these common optical modulator implementations take up a significant area of the chip and consume a substantial amount of power to tune the phase or absorption for signal modulation. Optical modulators with higher tuning efficiency and smaller footprint are desirable to decrease overall power consumption and increase device density in photonic circuits, especially in higher-lane-count photonic transceivers, where power and area requirements quickly add up.

BRIEF DESCRIPTION OF THE DRAWINGS

FIGS. 1C-1E are cross-sectional views taken from FIG. 1A along various horizontal lines.

FIG. 4 is a schematic block diagram of an example photonic transceiver system including a hybrid photonic ring modulator in accordance with various embodiments.

DESCRIPTION

Figure 1A:
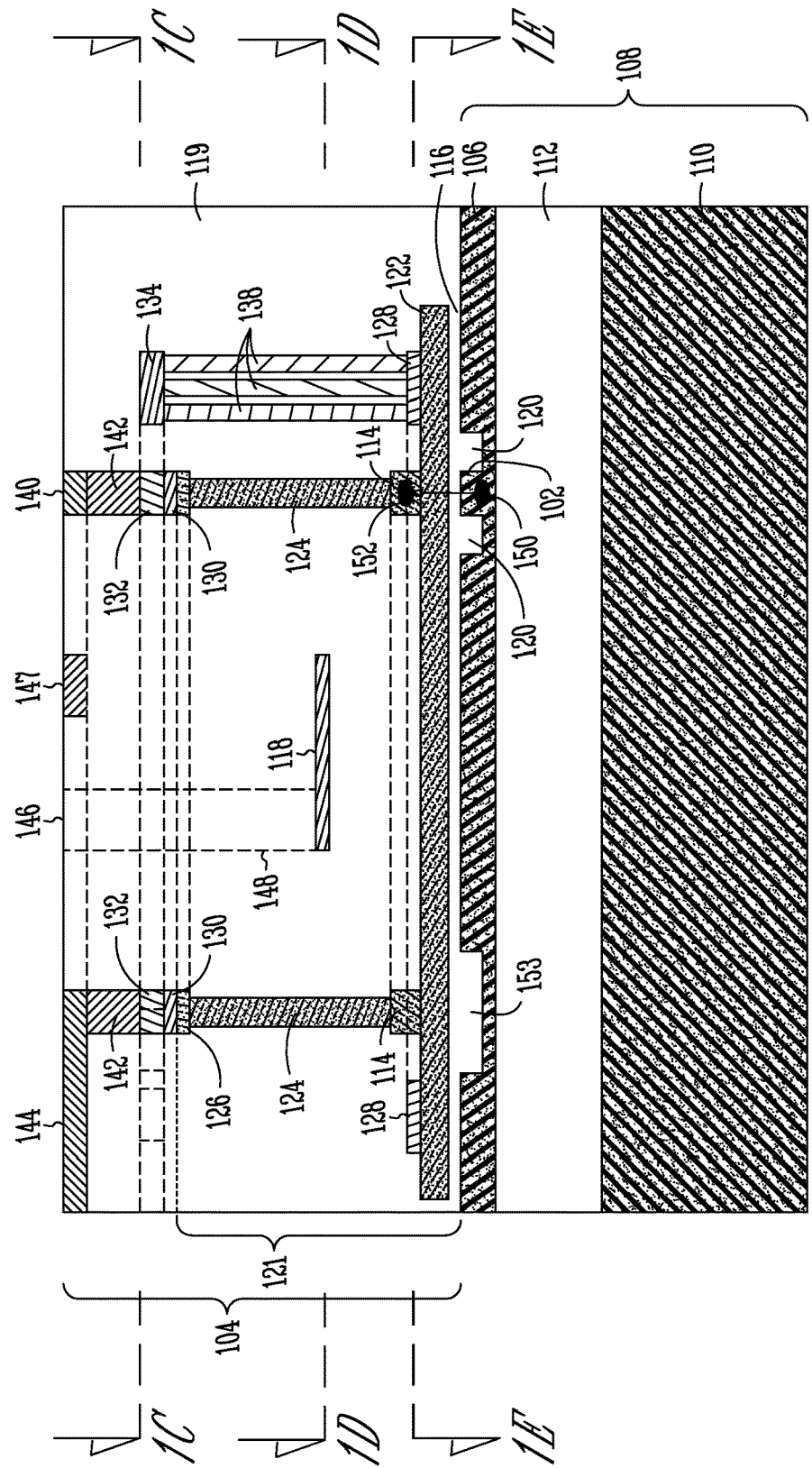
FIGS. 1A and 1B are cross-sectional side and top elevation views, respectively, of an example hybrid photonic ring modulator in accordance with various embodiments.

Described herein are hybrid photonic ring modulators formed of a silicon bus waveguide vertically coupled to a compound semiconductor ring waveguide that functions as a ring resonator and has a high-speed electrode connection to facilitate changing the refractive index in the ring waveguide and thereby shifting the resonance. In various embodiments, the ring waveguide is formed by the ring-shaped optically active region of a vertically layered p-i-n diode structure of compound semiconductor material, and the refractive-index change is achieved, based on the (linear and/or quadratic) electro-optic effect, by application of a voltage across the p-i-n diode structure.

In general, light entering the bus waveguide at its input is in part transmitted to the output of the bus waveguide and in part evanescently coupled into the ring waveguide and, after a round trip, back into the bus waveguide, where it interferes with the directly transmitted portion of the light. The resulting total transmitted power at the output as a fraction of input power is a function of the coupling coefficient between the bus waveguide and ring waveguide, the absorption in the ring waveguide, and the phase shift incurred in the ring waveguide during a round trip. If the round-trip phase is an integer multiple of $2\pi$, or, equivalently, the round-trip optical path length is an integer multiple of the wavelength of the light, the ring waveguide is in resonance and the transmission at the modulator output is at a minimum; the ring modulator, thus, functions as a spectral filter. The transmission minimum can be conceptually understood as destructive interference between the directly transmitted light and the light coupled back into the bus waveguide from the ring waveguide, which has undergone a coupling-induced $\pi$ phase shift. Further, for any given round-trip phase, the transmission is minimum when the intensity of the directly transmitted light equals the intensity of the light in the ring waveguide after completion of one round trip (as is affected by any absorption in the ring waveguide), a condition referred to as "critical coupling." If the intensity of the directly transmitted light is greater than that in the ring waveguide after one round trip, the modulator is "overcoupled;" if the intensity of the light after one round trip through the ring waveguide is greater, the modulator is "undercoupled." If the resonance and critical coupling conditions are simultaneously met, the transmitted power at the transmission minimum is zero.

By modulating the refractive index (and, thus, optical phase) in the ring waveguide via application of a an electrical voltage, the transmitted power can be modulated. The optical modulation amplitude (OMA), defined as the difference between maximum and minimum transmitted optical power during the RF voltage swing, depends on the refractive-index change over the RF swing as well as the relative optical intensities of the interfering components of the light (corresponding to whether the modulator is undercoupled, critically coupled, or overcooled). The refractive-index modulation, in turn, depends on the shift in wavelength of the modulator response per Volt, herein referred to as the "tuning efficiency." The maximum OMA occurs at high tuning efficiency and slight undercoupling.

Ring modulators provide a resonant enhancement to the OMA achieved with a given refractive-index modulation, and are, consequently, amenable to a much more compact design than non-resonant modulators like Mach-Zehnder and electro-absorption modulators. In various embodiments, the ring waveguide is, for instance, between 5 μm and 50 μm in diameter. For comparison, typical Mach-Zehnder interferometers are in the range from 1 mm to 5 mm in length, and typical electro-absorption modulators are about 150 μm or more in length. These savings in chip area allow for denser photonic circuits and lower wafer area cost.

In addition, compound semiconductor materials, as are used for the disclosed ring modulators, are subject to strong electro-optic effects, meaning that, under application of an electric voltage, they experience a large refractive-index change, and thus a high tuning efficiency. As a result, the maximum achievable OMA per applied voltage swing, herein referred to as "modulation efficiency," of hybrid photonic ring modulators in accordance herewith generally exceeds not only that of conventional Mach-Zehnder or electro-absorption modulators, but also that of silicon-only ring modulators (e.g., silicon diode ring modulators formed by a silicon ring waveguide horizontally coupled to a silicon bus waveguide). In various embodiments, hybrid photonic ring modulators achieve a voltage swing reduction for a given OMA of 40% or more, compared with electro-absorption or silicon diode ring modulators. This reduction in the voltage swing significantly reduces power consumption in photonic transceivers, where the modulator driver often consumes more than 10% of the total transceiver power. To provide a concrete example: an output OMA of 7 dBm at an input optical power of 10 dBm (where dBm expresses the power relative to one milliwatt in decibel) may take a peak-to-peak voltage swing of 1 V with a compound semiconductor ring modulator, but a peak-to-peak voltage swing of 1.75V with an electro-absorption modulator. This driver swing reduction corresponds to 130 mW in power savings per lane at 100 Gbps PAM4 modulation, or, equivalently, 0.5 W for a 4-lane transceiver and 4.2 W for a 32-lane transceiver.

In accordance with various embodiments, the modulation efficiency of the photonic ring modulator is optimized using a direct-current (DC) bias voltage across the diode to achieve high refractive-index change per applied voltage swing. The refractive-index shift in the ring waveguide generally results from a combination of the linear electro-optic (LEO) effect and the quadratic electro-optic (QEO) effect as well as free-carrier absorption, and the contribution of the QEO effect, which is desirably dominant because it reduces the voltage swing for a given OMA, increases with increased bias. Thus, a higher voltage bias can improve the tuning efficiency. However, a higher bias voltage also enhances absorption via the quantum confined Stark effect (QCSE). Thus, in operation, the bias voltage is set to a level that provides a high QEO effect without being so high as to cause significant QCSE absorption. For a given ring modulator configuration, that bias voltage level will also determine the spectral location of the modulator response and its resonance. In applications that use a tunable laser, the laser wavelength can then be adjusted to track the modulator response. In many applications, however, the operating wavelength of the laser will be fixed. To enable, in this case, the modulator response to track the laser wavelength, the ring modulator may be equipped with a heater, placed inside or outside the ring waveguide, that provides an independent mechanism for changing the refractive index in the ring waveguide. The laser wavelength or heater power, as applicable, may be used to position the modulator response at the optimum offset from the laser wavelength to optimize the OMA. The heater also provides a degree of freedom for compensating, in any manufactured ring modulator, for discrepancies between the nominal resonance wavelength of the design and the actual resonance wavelength at the set bias voltage, as well as for temperature-induced wavelength shifts. In some embodiments, values of the bias voltage and heater power level are determined by calibration for a range of temperatures and stored in memory for look-up during operation of the ring modulator.

As noted, hybrid photonic ring modulators provide benefits, in terms of footprint and power requirements, over non-resonant modulators as well as silicon-only ring modulators. Furthermore, as compared with ring modulators implemented entirely in compound-semiconductor materials, the herein-described hybrid ring modulators provide advantages for integration with silicon circuitry and manufacturability. One challenge with a compound semiconductor ring modulator including a compound semiconductor bus waveguide laterally coupled to a compound semiconductor ring waveguide in the same layer is the need to keep the outer sidewalls of the ring waveguide smooth to prevent optical losses due to scattering, and deeply etched to prevent radiation loss and leakage of the light outside of the ring. The deep etch around the outside of the ring reduces evanescent coupling laterally, and the deeper the etch, the closer the coupling waveguide needs to be placed. The deep etch thus restricts the lateral coupling efficiency, and requires fabrication technology to lithographically define and etch small dimensions without impacting the smoothness of the ring sidewall. Integration of a compound semiconductor ring waveguide with a silicon circuit including the bus waveguide in a hybrid photonic platform, as used herein, circumvents this problem by coupling light between the bus waveguide and ring waveguide vertically rather than laterally. Such vertical coupling does not impact the deep and smooth etch on the exterior of the ring. Furthermore, a vertically coupled structure can be fabricated with much smaller coupling distances than are achievable with lateral coupling, as the vertical coupling distance is defined via material deposition rather than lithography and etching. For example, a vertical coupling distance between the center of the mode guided in the compound semiconductor ring waveguide and the center of the mode guided in the silicon bus waveguide of about 0.5 μm or less can straightforwardly be achieved, whereas lateral coupling distances are typically greater than 0.5 μm, e.g., in the range from about between 0.6 μm and 2 μm (for both compound-semiconductor-only and silicon-only ring modulators). While hybrid integration adds some process complexity, hybrid material platforms are already in use, e.g., to implement lasers and photodetectors in photonic transceivers (or electro-absorption modulators, which, in accordance herewith, can be substituted with ring modulators), allowing the disclosed hybrid ring modulators to be implemented simply by adapting of existing hybrid processes.

Figure 1B:
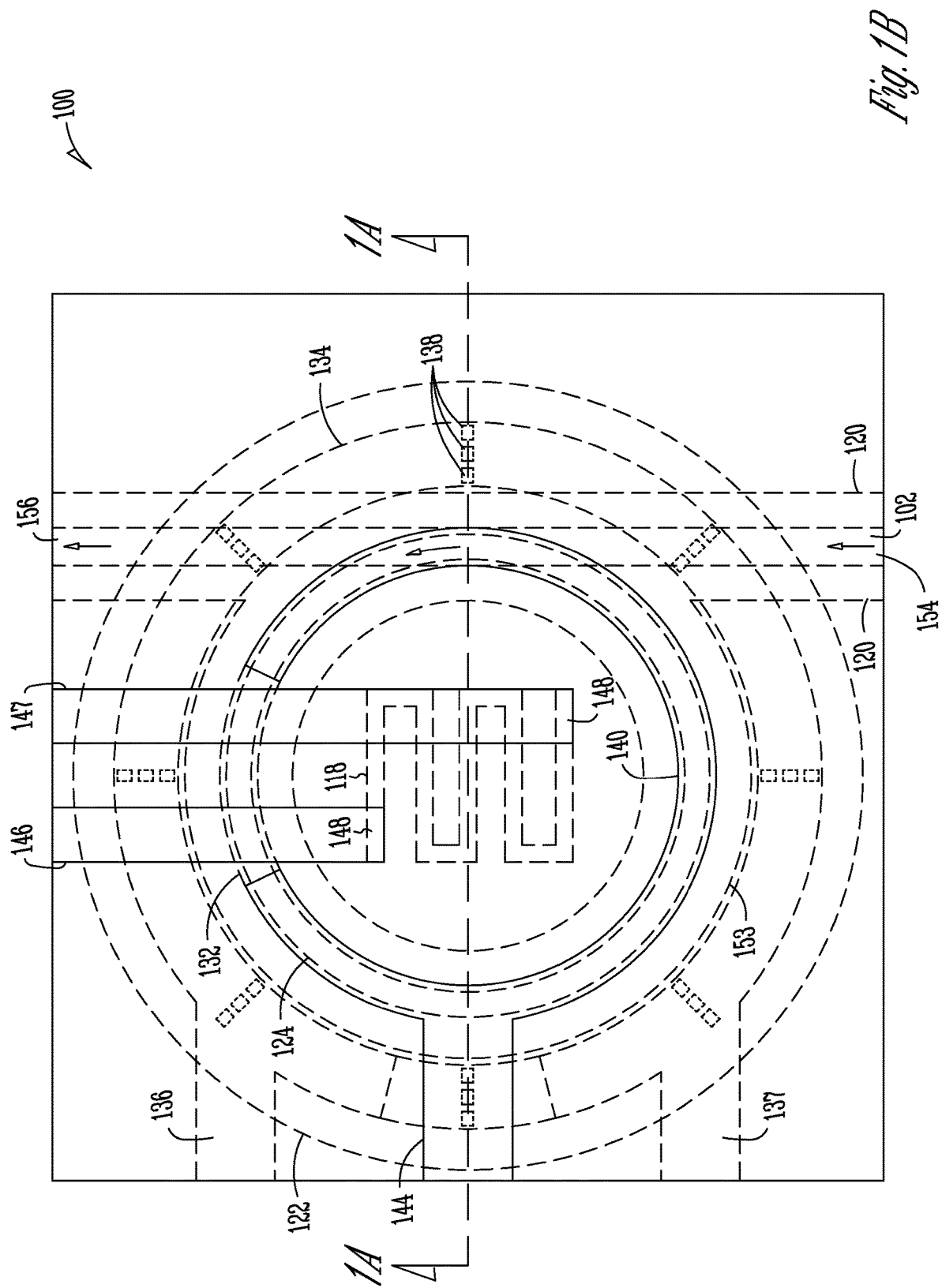
Figure 1D:
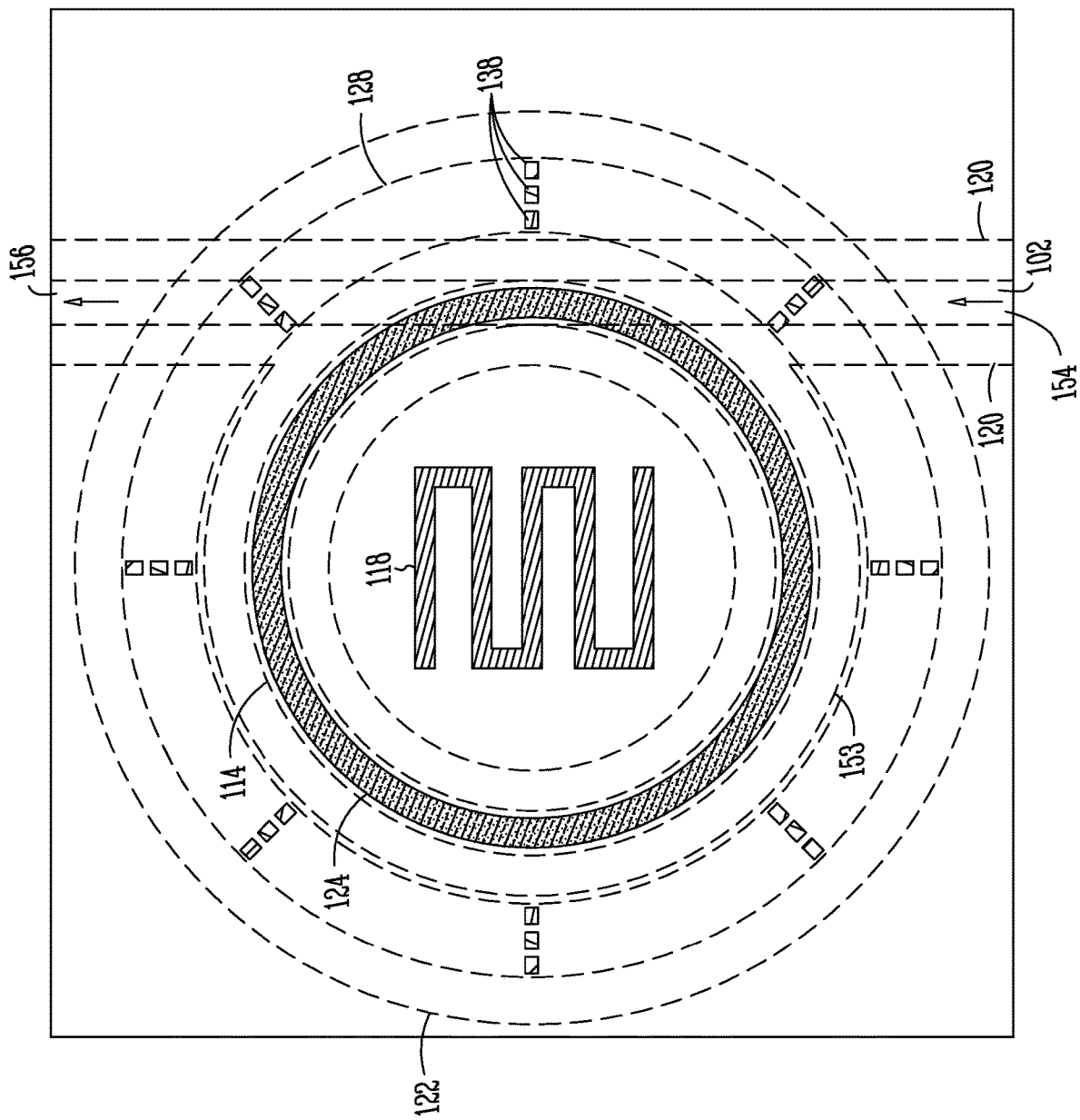

Referring now to the accompanying drawings, FIGS. 1A and 1B are cross-sectional side and top elevation views, respectively, of an example hybrid ring modulator 100 in accordance with various embodiments, and FIGS. 1C-1E are cross-sectional views taken from FIG. 1A along various horizontal lines. The ring modulator 100 includes a silicon bus waveguide 102 (herein also "silicon waveguide") and a ring resonator structure 104 including a compound semiconductor structure with associated electrical connections. The silicon bus waveguide 102 is formed in the silicon device layer 106 of an SOI substrate 108 (which also includes a silicon handle 110 and a buried oxide (BOX) or other insulating layer 112 between the silicon handle 110 and the silicon device layer 106). The compound semiconductor structure is formed in a layered stack of compound semiconductor material disposed above the substrate 108, and includes a ring waveguide 114 serving as a resonator. In various embodiments, the compound semiconductor material is a group III-V material such as, e.g., indium phosphide (InP), indium arsenide (InAs), gallium arsenide (GaAs), gallium nitride (GaN), or indium antimonide (InSb). However, group II-VI or other compound semiconductor materials may also be used in some embodiments. The compound semiconductor material may be bonded directly to the silicon device layer 106, or may be separated from the silicon device layer 10 by a thin layer of dielectric material 116, as shown. The ring modulator 100 may further include a heater 118 taking the form of a resistively heated metal filament, along with associated electrical connections. The heater 118 may be disposed, as shown, interior to the ring resonator structure 104, specifically interior to the ring waveguide 114 and/or ring-shaped layers thereabove. Alternatively, the heater 118 may at least partially surround the ring waveguide 114 and/or ring-shaped layers above. (See FIGS. 2A-2F below for various example heater configurations.) The ring resonator structure 104 and heater 118, including associated electrical connections, may be embedded in a dielectric cladding 119.

In the depicted embodiment, the silicon waveguide 102 is a rib waveguide defined between channels 120 created by a partial etch through the silicon device layer 106, leaving a thin slab of silicon underneath. The compound semiconductor structure is a cylindrically symmetric p-i-n diode structure 121 including an n-type layer 122, e.g., taking the form of a circular disk, and, disposed above the n-type layer 122, a ring-shaped mesa including an active layer (or "active region") that forms the ring waveguide 114 and a p-type layer 124 disposed above the ring waveguide 114, optionally covered by a thin p-contact layer 126. The heater 118 may be disposed at the level of the ring waveguide 114 or the p-type layer 124. To facilitate placing the heater 118 at the same vertical level as the ring waveguide 114, the n-type layer 122 may be etched below the heater 118 so as to form a ring structure. The active layer constituting the ring waveguide 114 may generally be formed of quantum wells, quantum dots, quantum dashes, or bulk compound semiconductor (e.g., III-V) material. In certain beneficial embodiments, multiple quantum wells are used for the active layer. The refractive-index change in the active region occurs primarily in the quantum wells, and the use of multiple wells can, thus, serve to increase the overlap between the optical mode in the ring waveguide 114 and the region of changed refractive index. To reduce absorption of light in the active region due to the QCSE, the quantum wells may be designed such that their photoluminescence wavelength is detuned substantially (e.g., by at least 100 nm) from the intended operating wavelength of the light to be modulated (e.g., the laser wavelength).

The electrical connections to the p-i-n diode structure 121 include an n-contact ring electrode 128 disposed on top of the n-type layer 122, surrounding the ring-shaped mesa, and a p-contact ring electrode 130 disposed on top of the p-contact layer 126 (or, in embodiments not including a p-contact layer, directly on top of the p-type layer 124). Furthermore, the electrical connections include metal routing layers and vias for connecting the electrodes 128, 130 to electrical terminals of electronic driver circuitry associated with, and used to operate, the p-i-n diode structure 121 and for connecting the heater 118 to a heater power source. A first metal routing layer disposed at a level just above the p-contact ring electrode 130 includes a closed metal ring 132 directly on top of the p-contact ring electrode 130, and a broken metal ring 134 above the n-contact ring electrode 128 with associated laterally extending metal traces 136, 137. The broken metal ring 134 extends along the larger part of the circumference of the n-contact ring electrode 128 and is connected to the n-contact ring electrode 128 by one or more metal vias 138, which may be placed at various angles along the ring 134. A second metal routing layer disposed at a level above that of the first routing layer includes a broken metal ring 140 above the closed metal ring 132, connected to the closed metal ring 132 by metal vias (or a single, e.g., ring-shaped via) 142, and having an associated laterally extending metal trace 144. The metal trace 144 is located above the break in the ring 134 of the first metal routing layer; this break serves to avoid an increased capacitance between the first and second metal routing layers, which might otherwise negatively affect the achievable signal modulation speed. The break in the metal ring 140 serves to accommodate metal traces 146, 147 in the second metal routing layer to vias 148 vertically connecting the traces 146, 147 to the heater 118. In embodiments where the heater 118 is disposed surrounding the ring waveguide 114, as well as embodiments without a heater 118, the metal ring in the second metal routing layer may be closed. The configuration of the metal routing layers and vias is designed to enable continuous circular contact with both the p-type and n-type layers, as established by the ring electrodes 128, 130. The vias 138 connecting the first and second metal layers allow the p-side electrical interface to route over the n-side electrical interface without creating a break in the n-contact electrode Similarly, the heater electrical interface can route over the p-side and n-side electrical interfaces without causing breaks in their contact electrodes.

The ring waveguide 114 is positioned with a portion of its circumference laterally overlapping the silicon bus waveguide 102, enabling light to couple vertically between the silicon bus waveguide 102 and the ring waveguide 114 in the overlap region, or "coupling region," as indicated by optical modes 150, 152 in FIG. 1B. In other words, the silicon bus waveguide 102 and ring waveguide 114 form a vertical directional coupler in the coupling region. As shown, the silicon waveguide 102 may be straight and uniform in width. In alternative embodiments, the silicon waveguide 102 may be curved, e.g., to follow part of the contour of the ring waveguide 114, and/or tapered down and back up in the overlap region to improve coupling efficiency. To reduce optical losses in the ring waveguide 114 due to coupling into the silicon device layer 106 underneath, the silicon may be etched and oxide-filled (or filled with some other dielectric) in a ring-shaped channel 153 extending underneath the ring waveguide 114 and merging, to one side of the ring waveguide 114, with one of the channels 120 defining the bus waveguide 102. FIGS. 1B-1E illustrate with arrows the direction of light propagation in the silicon bus waveguide 102 from an optical input (generally indicated at 154) to an optical output (generally indicated at 156), as well as the direction of light propagation in the ring waveguide 114 (counterclockwise in the depicted case).

The structure of the hybrid ring modulator 100 can be altered in various ways without departing from the general design principles. For example, the p-i-n diode may be formed with a p-type (rather than n-type) circular disk on the bottom and a ring-shaped n-type (rather than p-type) layer on the top. Also, the relative widths and thicknesses of various rings and layers, and other dimensions, may differ from those depicted. (In general, it is to be understood that FIGS. 1A-1E are not drawn to scale, but merely serve to schematically depict the structural configuration of the ring modulator.) Further, the electrodes and metal traces and vias that, collectively, form the electrical interface to the n-type and p-type layers and, where applicable, to the heater 118 may be configured in many different ways (including, e.g., with fewer or more metal routing layers), although some implementations are preferable over others (e.g., in terms of contact efficiency, manufacturing complexity, and other criteria). In addition, in certain embodiments, e.g., where the ring modulator is used in conjunction with a tunable laser input, the heater 118 may be omitted.

Figure 2A:
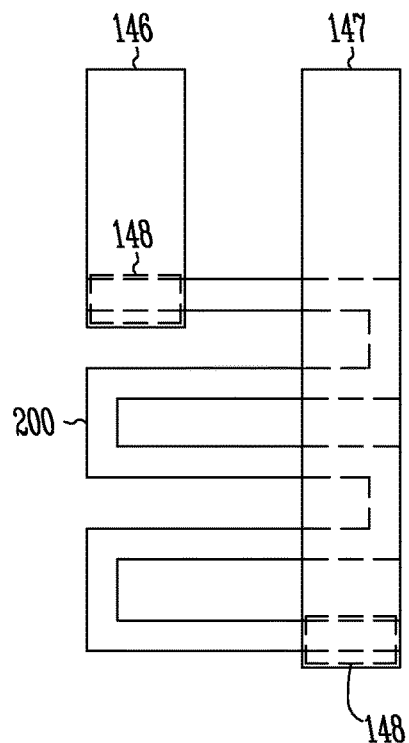
FIGS. 2A-2F are top views of example heater configurations, in accordance with various embodiments, for use in a hybrid photonic ring modulator as shown in FIGS. 1A and 1B.
Figure 2B:
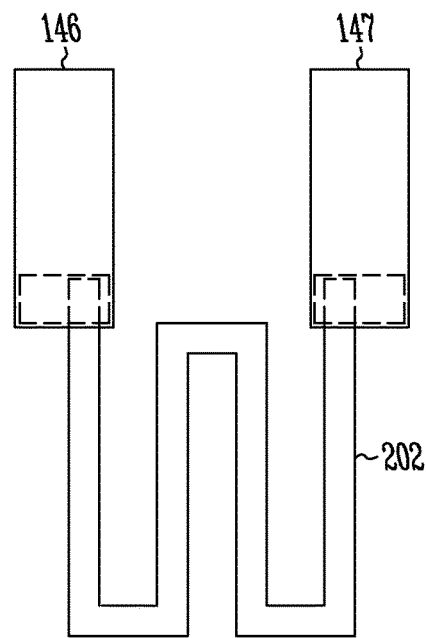

Turning now to FIGS. 2A-2F, example heater configurations, in accordance with various embodiments, for use in a hybrid ring modulator 100 as shown in FIGS. 1A-1E are illustrated in top views. FIGS. 2A and 2B show heaters 200, 202 for placement interior to the ring waveguide 114 (if projected into the plane of the substrate, that is, disregarding any vertical displacement), implemented as serpentine metal filaments that differ from each other in the orientation of the serpentines relative to the metal traces 146, 147 that connect, by vertical vias 148, to the terminal points of the respective heater 200, 202. In the serpentine heater 200, shown in FIG. 2A as well as in FIG. 1A, the serpentines are oriented perpendicularly to the metal traces 146, 147 routed to the heater 200. In the serpentine heater 202 of FIG. 2B, the serpentines are oriented in parallel with the metal traces 146, 147, and the terminal points (and vias 148) are on the same side of the heater 202 as the metal traces 146, 147.

Figure 2C:
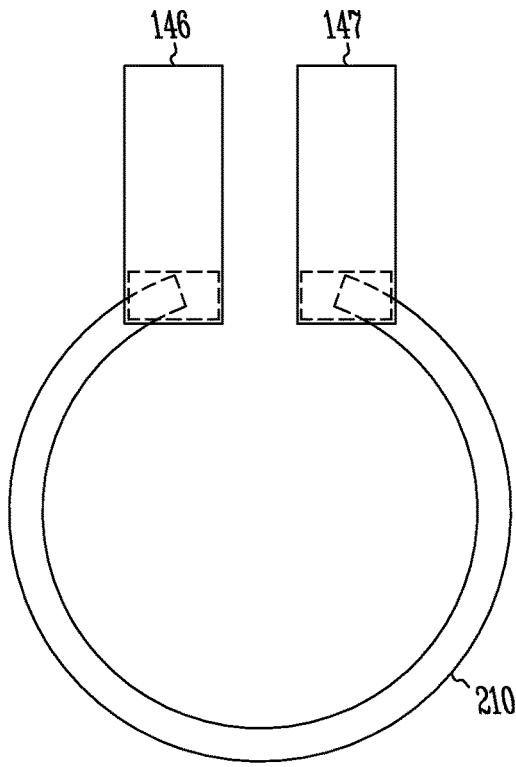
Figure 2D:
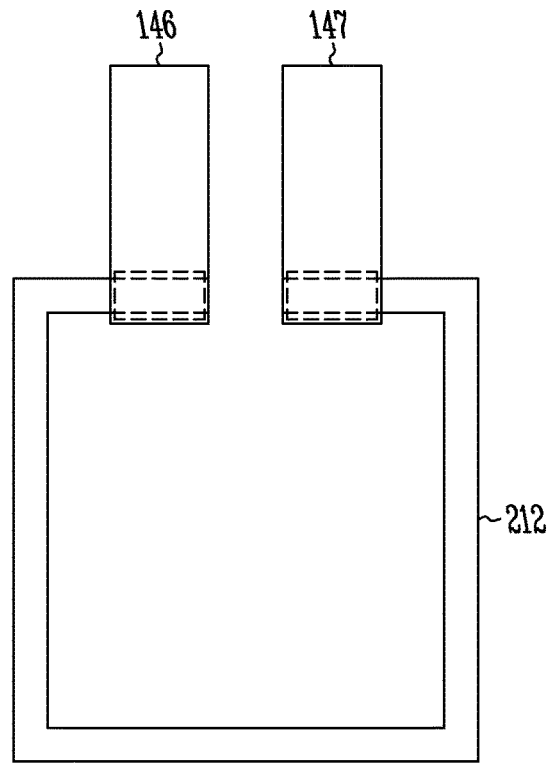

FIGS. 2B and 2C illustrate heaters 210, 212, also for placement inside the ring waveguide 114, that are implemented as arc-shaped (substantially circular) and square-shaped metal filaments extending along part of the circumference of the ring waveguide 114. Other convex heater shapes (e.g., formed by hexagonal or rectangular filaments, etc.) are also possible. The heaters 210, 212 extend almost all the way around the ring waveguide 114, leaving a small opening that separates the terminal points connected to the metal traces 146, 147. In general, these and similar convex-shaped heaters may cover an angle of at least 270° about a center of the ring resonator structure.

Figure 2F:
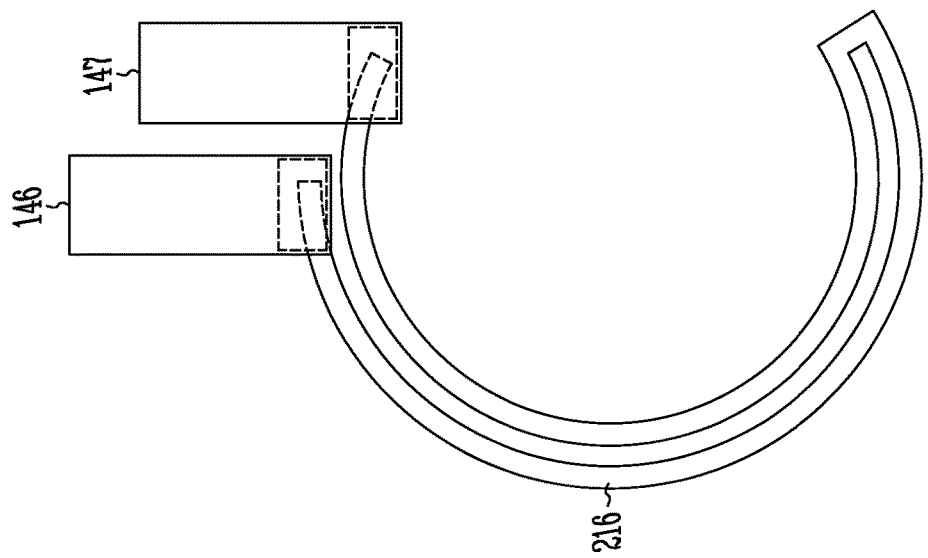
Figure 2E:
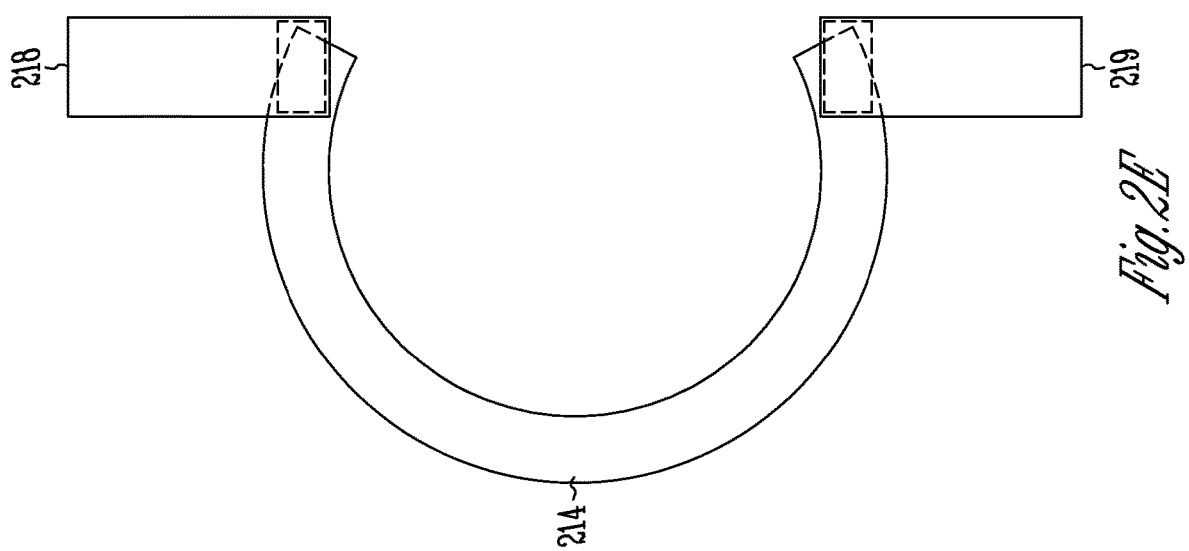

FIGS. 2E and 2F provide examples of heaters 214, 216 placed exterior to the ring waveguide 114, both extending partially around the ring waveguide 114 (e.g., enclosing an angle of at least 180° about a center of the ring waveguide 114). In FIG. 2E, the heater 214 takes the form of a single, wider metal filament extending in an arc around the ring waveguide 114, with terminal points on both sides of the heater and with associated metal traces 218, 219 coming in from different directions. In FIG. 2F, the heater 216 is an arc-shaped serpentine filament that extends back and forth along a portion of the circumference of the ring waveguide 114, with terminal points and metal traces 146, 147 on the same side of the heater 216. As will be appreciated by those of ordinary skill in the art, the various depicted heater configurations are merely examples, and other shapes and configurations may alternatively be used. In general, the heater 118 is configured to be in sufficient proximity to the ring waveguide 114 to efficiently heat the ring waveguide 114.

Figure 3A:
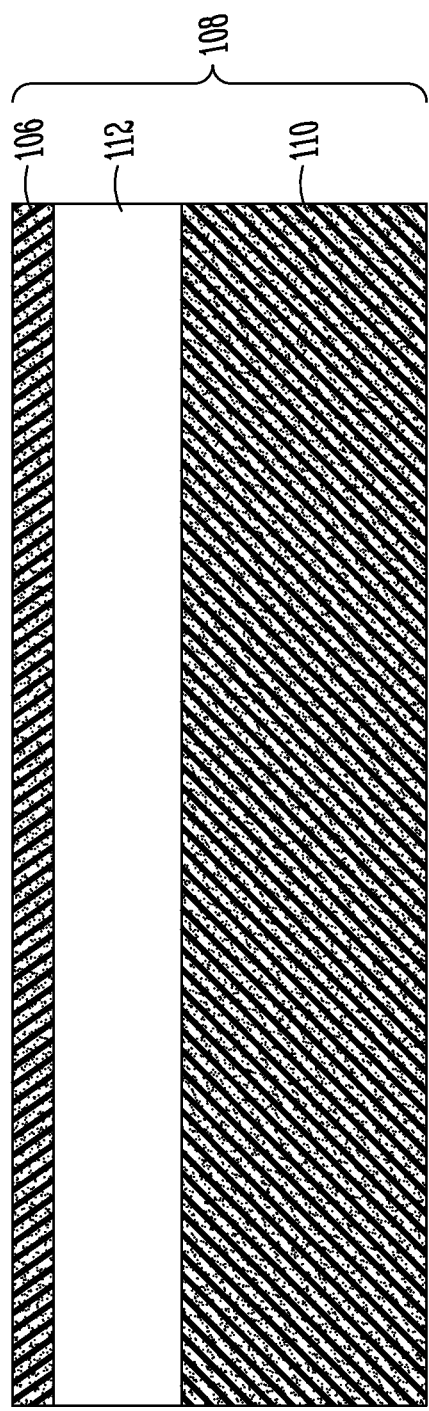
FIGS. 3A-3G are cross-sectional side views of semiconductor photonic structures at various stages during fabrication, in accordance with various embodiments, of a hybrid photonic ring modulator as shown in FIGS. 1A-1E.
Figure 3B:
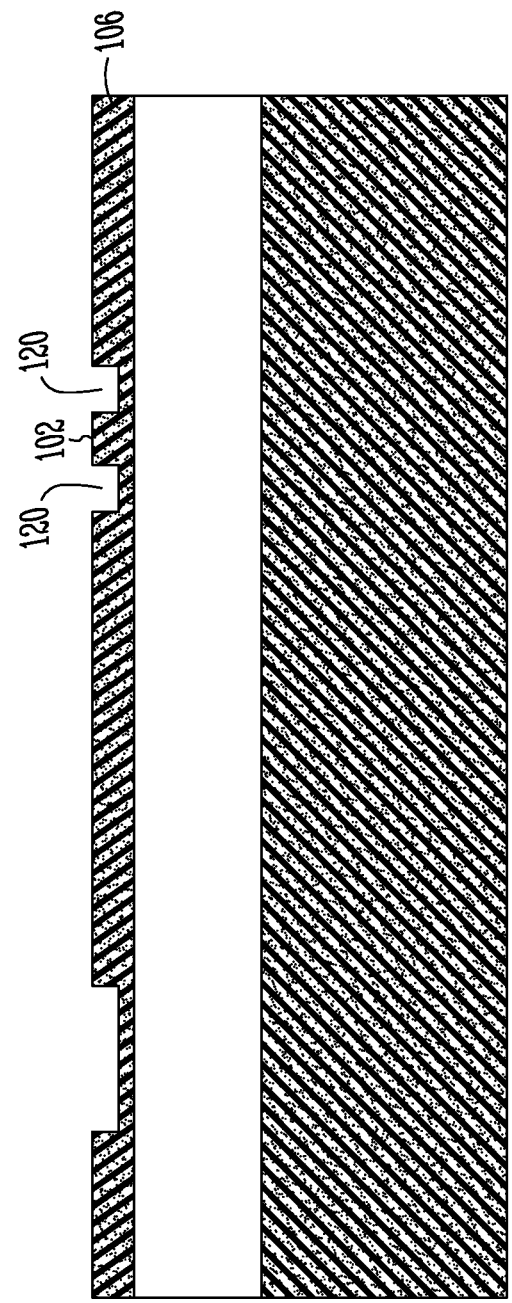
Figure 3C:
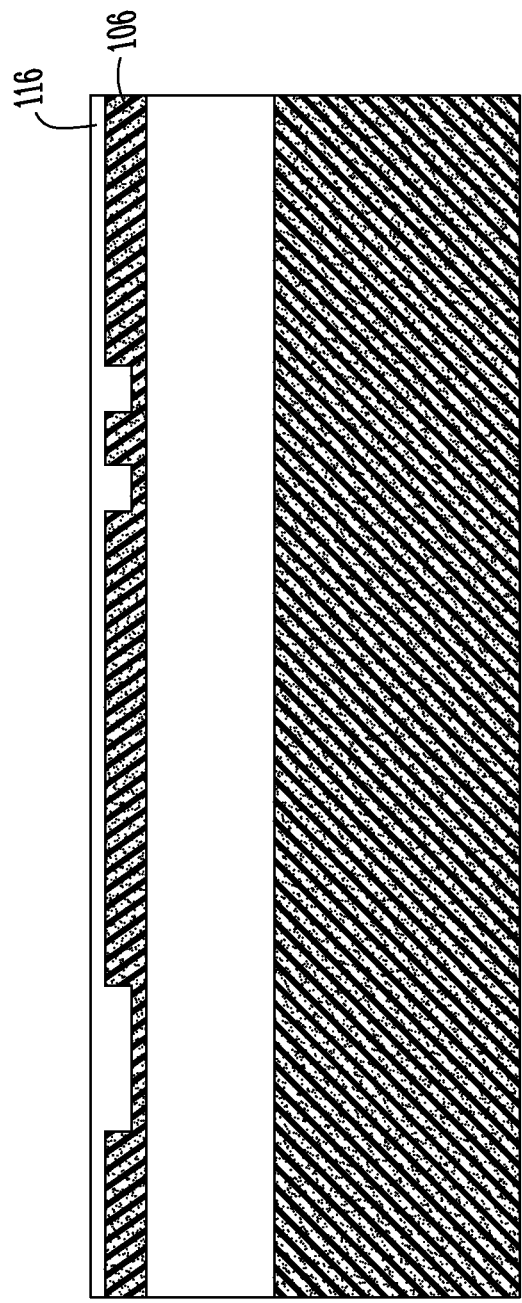
Figure 3H:
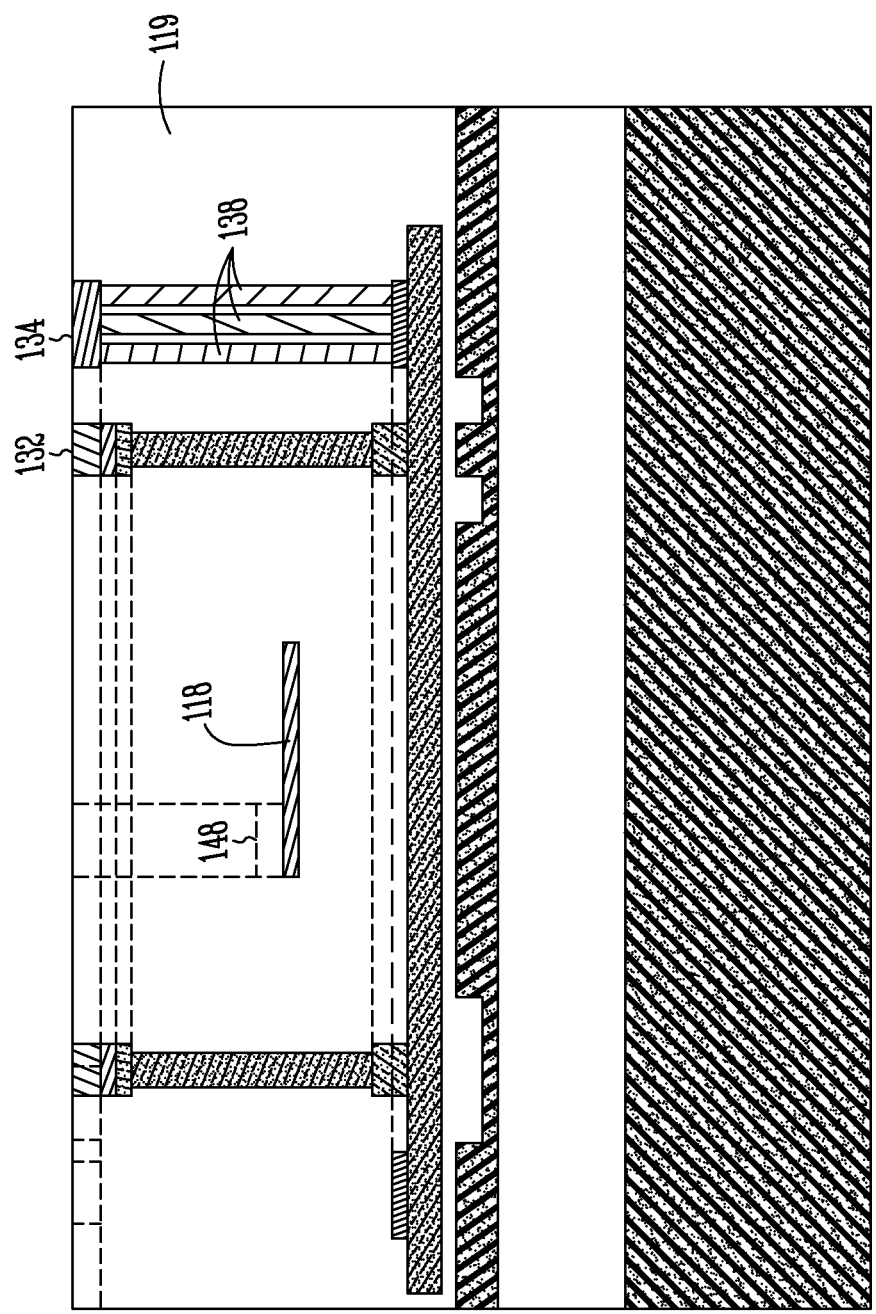

FIGS. 3A-3G are cross-sectional side views of semiconductor photonic structures at various stages during fabrication, in accordance with various embodiments, of a hybrid ring modulator 100 as shown in FIGS. 1A-1E. The ring modulator 100 is formed on an SOI substrate 108 including a silicon handle 110, BOX (e.g., silicon oxide layer) 112, and silicon device layer 106, shown in FIG. 3A. Fabrication begins by photolithographically patterning and etching the silicon device layer 106 to form the silicon bus waveguide 102 and the channel that is to extend underneath the ring waveguide 114, shown in FIG. 3B, along with any other waveguides and silicon device structures of the larger photonic circuit in which the ring modulator 100 is integrated. The silicon bus waveguide 102 may form a rib defined between channels 120 created in the silicon device layer 106 by a partial etch. Following such patterning of the silicon device layer 106, a dielectric (e.g., silicon oxide) layer 116 is applied over the silicon device layer 106 to fill the channels 120 (and other etched features) and planarize the patterned substrate 108, as shown in FIG. 3C.

Creation of the compound semiconductor structure of the ring modulator begins by bonding a compound semiconductor die 300 with suitable layer structure to the dielectric layer 116, laterally overlapping with the silicon bus waveguide 102 formed in the silicon device layer 106, as shown in FIG. 3D. The bonding may be achieved, e.g., using plasma activation of the bonding surfaces followed by annealing or vacuum-assisted wafer bonding, or using other bonding techniques known to those of ordinary skill in the art. In various embodiments, the die 300 is made of III-V material, and includes suitably doped and intrinsic layers that will serve as the n-type, active, p-type, and p-contact layers of the p-i-n diode structure 121. The diode structure 121 is created in the die 300 by a sequence of alternating photo-lithographic patterning and etching steps to form the bottom circular disk and ring-shaped mesa thereabove, and the bottom n-type layer 122 and p-contact layer 126 at the top are subsequently metalized to create the n-contact and p-contact ring electrodes 128, 130, shown in FIG. 3E.

The heater 118 and the metal rings 132, 134 and associated traces of the first metal routing layer and associated vias 138 are then created by planarizing with a dielectric cladding 119, patterning and etching the dielectric cladding 119, and filling the etched structures with metal and polishing back in multiple steps. FIG. 3F illustrates the resulting structure. The second metal routing layer and associated vias 142 are then created in a similar process, by planarizing with more dielectric cladding 119, etching and filling vias 142, 148 that connect the second metal routing layer to first routing layer and to the heater 118, and applying the second metal routing layer, including the metal ring 140 and associated trace 144 and the metal traces 146, 147 for the heater 118. FIG. 3G shows the resulting final structure of the ring modulator 100.

Hybrid ring modulators 100 as described above can generally be used in any photonic systems implemented in a hybrid material platform, including, e.g., in photonic transmitters or transceivers. The small footprint and high tuning efficiency afforded by hybrid ring modulators 100 are particularly advantageous, compared with conventional optical modulators such as electro-absorption or Mach-Zehnder modulators, to facilitate high lane counts (e.g., greater than sixteen) in transmitters or transceivers.

FIG. 4 is a schematic block diagram of an example photonic transceiver system 400 including a hybrid ring modulator 402 (e.g., as implemented by the ring modulator 100 shown in FIGS. 1A-1E) in accordance with various embodiments. For simplicity, only a single lane is shown. It is to be understood, however, that the depicted components can be straightforwardly replicated to achieve multi-lane transceiver embodiments. The photonic transceiver system 400 includes a PIC 404 interfacing with electronic circuitry 406 that provides control and data-processing functions.

The PIC 404 includes a laser 408 generating the optical carrier signal, the ring modulator 402, which amplitude-modulates the optical carrier signal output by the laser 408 in accordance with an applied electrical signal, and a transmitter output port 410. Laser 408, ring modulator 402, and transmitter output port 410 are optically coupled by a transmitter-path waveguide 412, a portion of which forms the bus waveguide of the ring modulator 402. The PIC 404 further includes a data photodiode 414 that serves to convert modulated (data-carrying) optical signals received via a receiver-path waveguide 416 from a receiver input port 418 into electrical signals. The transmitter output port 410 and receiver input port 418 may be implemented, e.g., as optical couplers that couple light between the transceiver waveguides 412, 416 and optical fibers of an optical communication network. The laser 408 and photodiode 414, like the ring modulator 402, may be implemented using III-V (or other compound semiconductor) materials for their respective optically active regions.

The PIC 404 may further include, as shown, taps 420 in the transmitter-path waveguide 412 preceding and following the ring modulator 402. The taps 420 split off a small fixed fraction (e.g., 5% by intensity) of the laser light in the transmitter-path waveguide 412 and direct that fraction to a respective monitor photodiode 422 (e.g., implemented likewise using III-V materials). Monitoring the optical intensity before and after the ring modulator 402 can provide feedback to adjust modulator settings, such as DC voltage and heater power levels, to achieve a target insertion loss, both during calibration and in mission-mode operation; detail of such feedback control is provided below with reference to FIGS. 7 and 8.

The electronic circuitry 406 communicates with various optical components of the PIC via electronic power/control and data lines (indicated by dashed lines). For example, the electronic circuitry includes a modulator driver 424 that applies an electrical swing voltage (e.g., in the RF regime), and optionally a DC bias voltage, across the p-i-n diode of the ring modulator 402. Further, in ring modulator embodiments including a heater, the electronic circuitry 406 includes a digital-to-analog converter (DAC) circuit 426 that provides power, at a level set by the digital input signal to the DAC circuit 426, to the modulator heater. An analog-to-digital converter (ADC) circuit 428 serves to read out the monitor photodiodes 422. Moreover, to process optical signals received by the PIC receiver, the electronic circuitry 406 includes an amplifier, equalizer, and high-speed ADC circuit 430 for data readout from the data photodiode 414 of the receiver. The modulator driver 424, DAC circuit 426 for the modulator ring heater, ADC circuit for the monitor photodiodes 422, and high-speed ADC circuit 430 for readout of the data photodiode 414 may all communicate with a microprocessor 432, which, in turn, my include or access integrated memory 434 (e.g., flash memory) that stores, for example, voltage and power settings associated with the ring modulator 402.

To implement a multi-lane transceiver system, various optical and electronic components may be replicated. In a multi-lane transceiver system, each lane has its own ring modulator 402 and associated modulator driver 424 and DAC circuit 426 for the heater (if applicable), as well as its own data photodiode 414. Further, each lane may include its own laser 408, although, alternatively, the output of a laser may also be split among multiple lanes prior to modulation. Similarly, each lane may have its own transmitter output port 410 and receiver input port 418, or, alternatively, modulated signals at different wavelengths from different lanes may be multiplexed and transmitted via a shared output port 410, and multiplexed incoming signals received via a shared input port 416 may be demultiplexed prior to distribution between multiple associated lanes. In various embodiments, hybrid photonic ring modulators as discussed herein, by virtue of their power efficiency and small footprint, can facilitate higher-lane-count photonic transceiver systems than are feasible with other types of optical modulators.

Figure 5A:
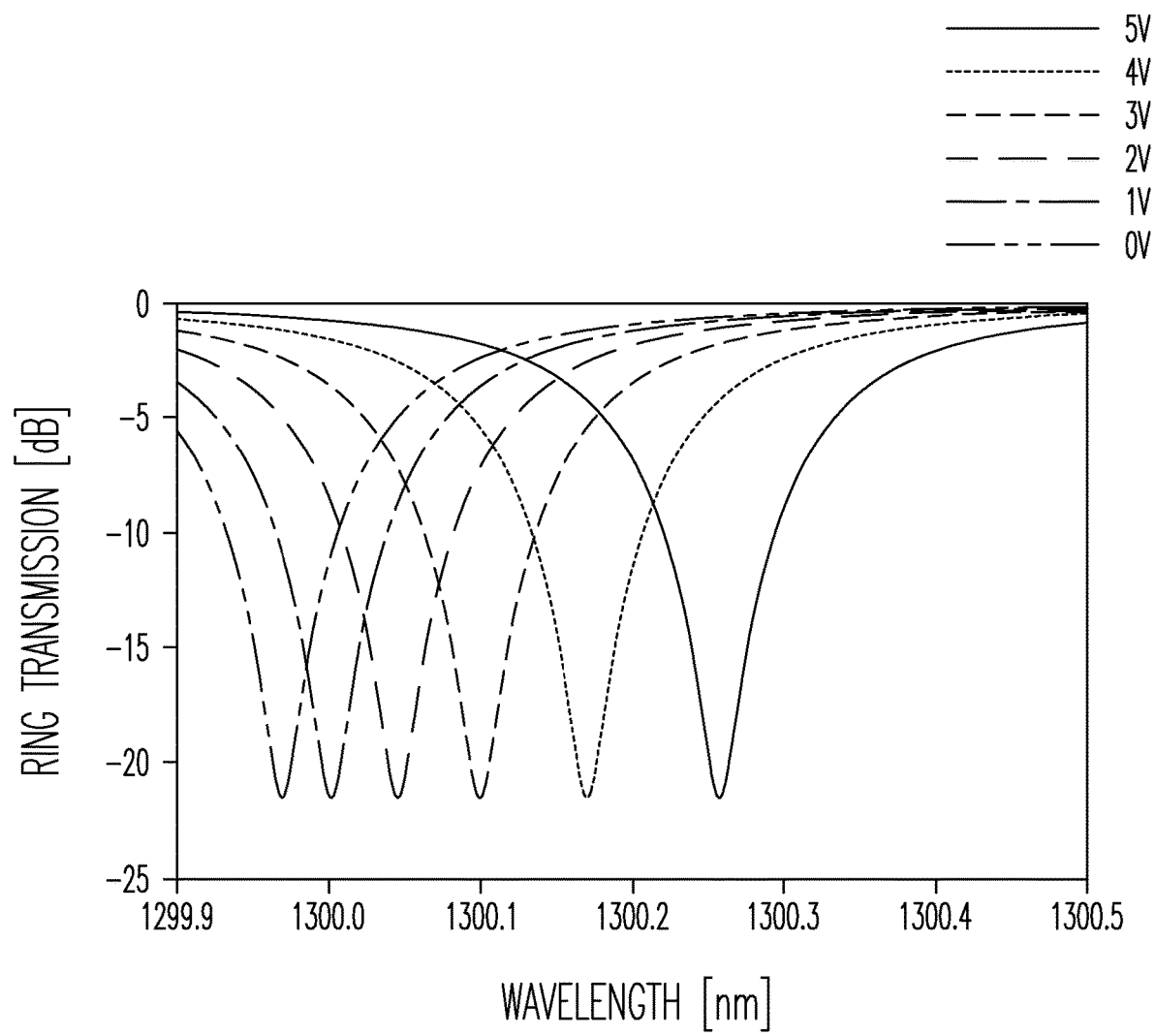
FIGS. 5A and 5B are example spectral modulator responses of a hybrid photonic ring modulator, in accordance with various embodiments, at various bias voltage levels without and with absorption at higher bias voltage, respectively.
Figure 5B:
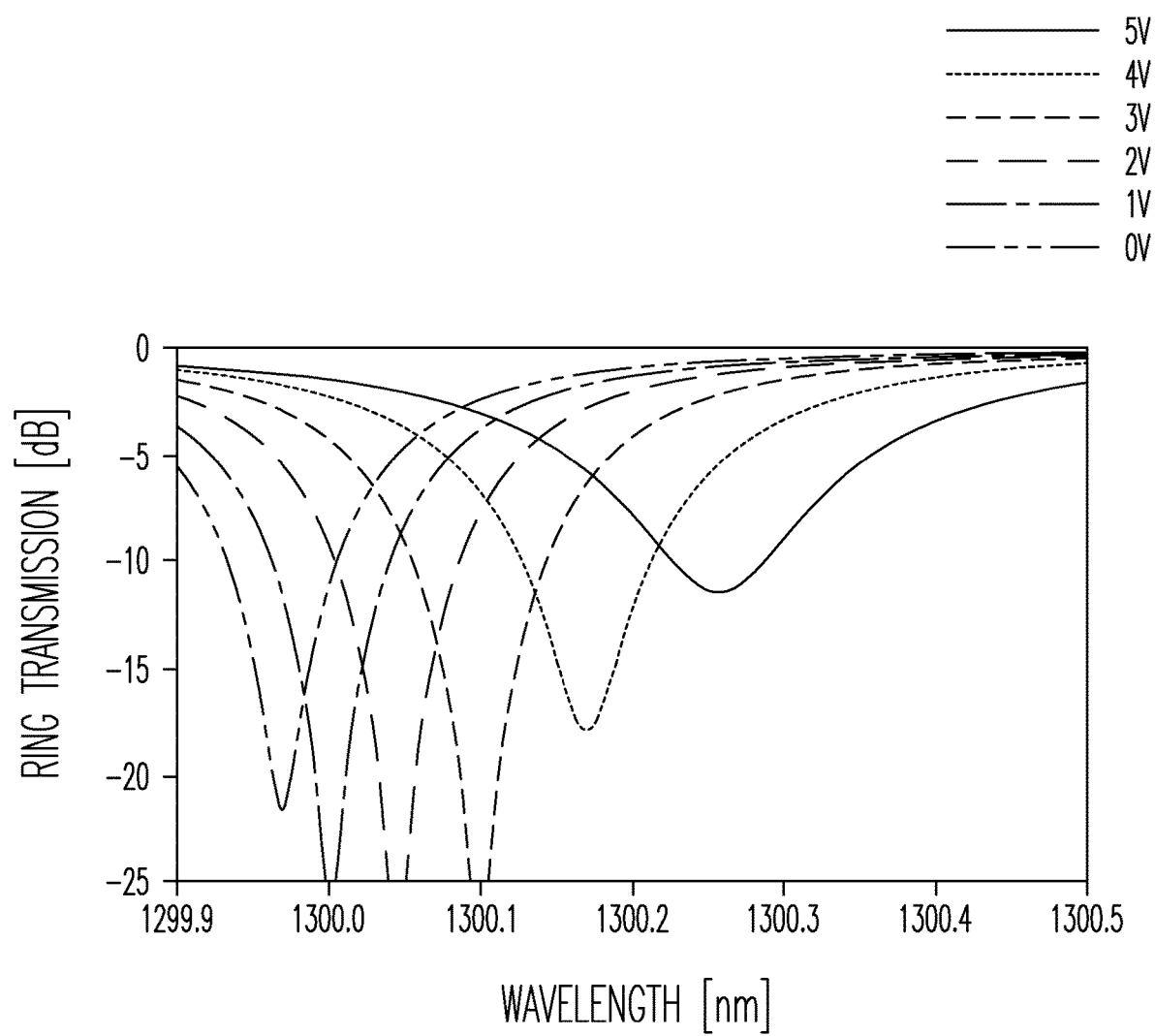

Addressing now modulation performance, FIGS. 5A and 5B are example spectral modulator responses of a hybrid photonic ring modulator, in accordance with various embodiments, at various bias voltage levels without and with absorption at higher bias voltage, respectively. All modulator responses (or "transmission curves") show the transmission of the ring modulator, that is, the optical power at the output of the bus waveguide, measured in decibel relative to the input optical power, as a function of laser wavelength over a range from 1299.9 nm to 1300.5 nm.

In the absence of any voltage-dependent change in absorption in the ring waveguide (e.g., due to sufficient detuning of the quantum well photoluminescence wavelength from the laser operating wavelength), as shown in FIG. 5A, the minimum transmitted power (corresponding to the spectral peak of each transmission curve) is independent of the bias voltage level; in the depicted example, that minimum has a value of a little less than −20 dB, corresponding to an output power of less than 1% of the input power and, thus, an insertion loss in excess of 99% of the input. As can be seen, the modulator response, including its resonance wavelength (that is, the wavelength associated with the peak), shifts to longer wavelengths with increasing voltage, reflecting an increase in the index of refraction, or an increase in the optical phase at a given operating wavelength. This effect is exploited to modulate the transmission by superposing a swing voltage onto the bias voltage. A monotonic increase or decrease of the transmitted power as a function of swing voltage can be achieved by tuning the spectral position of the modulator response relative to the operating wavelength of the modulated light such that the operating wavelength falls to the left or right, respectively, of the (shifting) peak during the full swing, which may, for instance, span a range of 1 V from peak to peak. As can further be discerned from FIG. 5A, the wavelength shift per voltage increment, or wavelength gradient, increases with increasing voltage, as reflected, in the series of transmission curves for equidistant bias voltages of 0 V, 1 V, 2 V, 3 V, 4 V, and 5 V, in the greater spread between adjacent curves for higher voltage. This increase in wavelength gradient is a result of the increasingly dominant QEO effect at higher voltages, and corresponds to an increase in tuning efficiency.

In practice, the absorption in the ring waveguide increases at least slightly at higher bias due to the QCSE, although this effect can be reduced, as noted, by moving the absorption wavelength of the ring waveguide (via suitable design of the quantum wells) away from the operating wavelength. FIG. 5B illustrates a case where the increase in absorption between bias voltages of 0 V and 5 V is substantial (due to a detuning of the quantum well photoluminescence of only about 100 nm, as compared with 150 nm or more for FIG. 5A). In the depicted example, the ring modulator is critically coupled at a bias of around 2 V, undercoupled at 0 V, and overcoupled at 4 V and 5 V. In the undercoupled case, the optical power after one round trip in the ring waveguide, which is coupled back into the bus waveguide, exceeds the optical power directly transmitted along the bus waveguide from the input to the output. In the overcoupled case, the directly transmitted power exceeds the power after one round trip through the ring waveguide, due to high absorption in the ring waveguide. At high undercoupling or at high overcoupling, the modulation efficiency is reduced; the maximum modulation efficiency occurs when the modulator is only slightly undercoupled, near critical coupling.

Balancing the increase in tuning efficiency obtained by the QEO effect against the decrease in modulation efficiency resulting from QCSE-based optical absorption, it is generally desirable that the operating wavelength falls near the peak of the modulator response associated with a bias voltage that is high, but not too high (e.g., in the example shown, a bias voltage of about 5 V in FIG. 5A or 3 V in FIG. 5B). The alignment of the operating wavelength with the modulator response for the desired bias voltage can be achieved by tuning the operating wavelength itself, or, if the operating wavelength is fixed, by heating the ring modulator. Heat, like an increase in bias voltage, shifts the modulator response to longer wavelengths. Over a typical range of heater power levels, the modulator response may shift over multiple free spectral ranges (FSRs) associated with multiple respective resonances of the modulator (where adjacent spectral ranges differ by $2\pi$ in the optical phase accumulated in the ring waveguide), allowing the heater to effectively select an FSR of the modulator that is aligned with the laser wavelength at a desired point along the modulator response.

Figure 6:
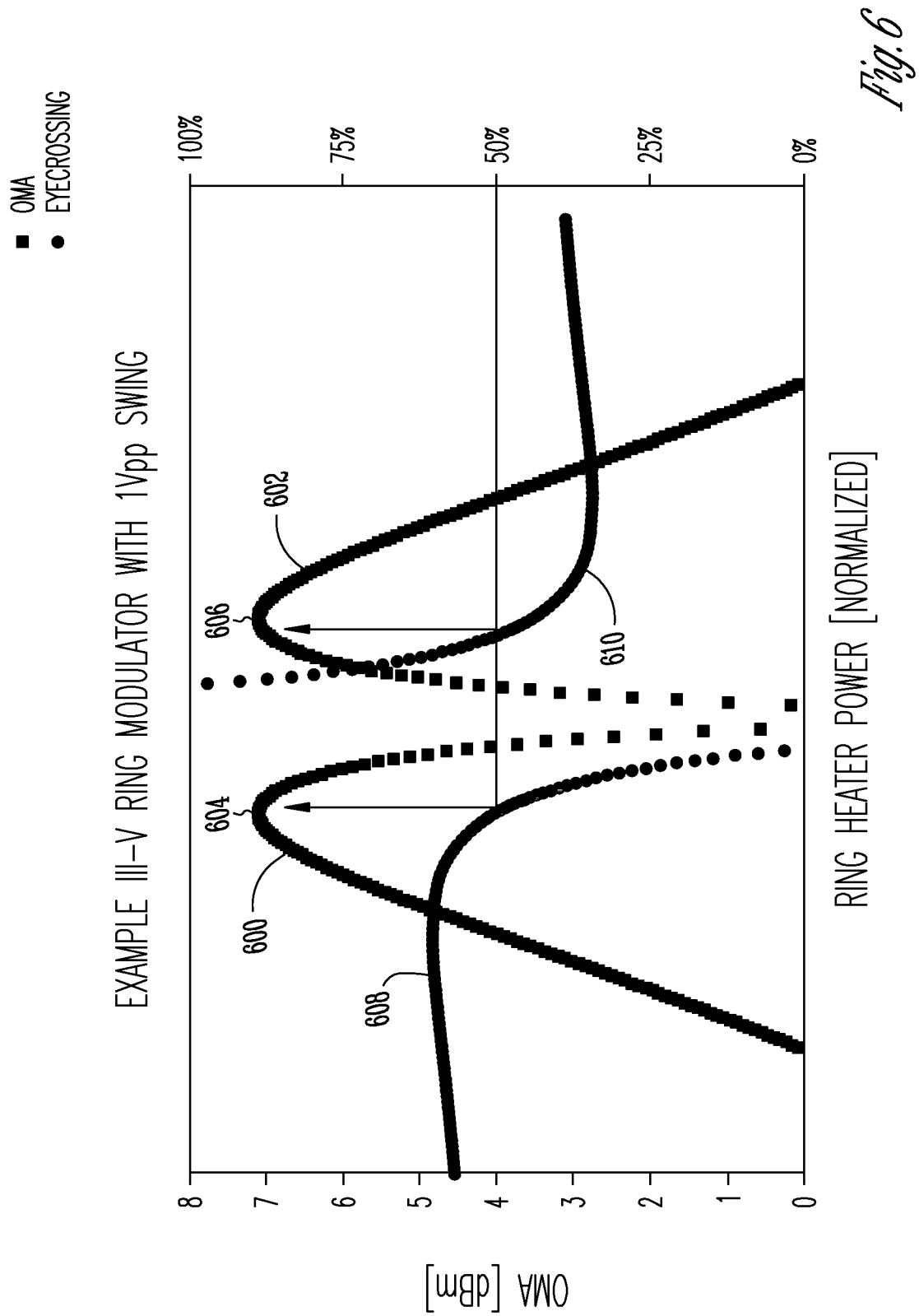
FIG. 6 is a graph showing example optical amplitude modulation and eye crossing for a hybrid photonic ring modulator in accordance with various embodiments as a function of heater power.

FIG. 6 is a graph showing example OMA and eye crossing for a hybrid ring modulator in accordance with various embodiments as a function of heater power. The ring modulator is, in this example, a III-V-on-silicon ring modulator with negligible absorption at higher bias voltage. A voltage swing of 1 V (peak-to-peak) is applied at a fixed bias voltage level, and the laser is held at a fixed operating wavelength. As the heater power increases, the transmission curve of the modulator for the selected bias voltage shifts towards longer wavelengths, and the operating point along the transmission curve, which is determined by the laser wavelength and corresponds to the center of the voltage swing (e.g., zero volts for a swing from −0.5 V to +0.5 V), accordingly, travels relative to the transmission curve in a direction towards lower wavelengths. As shown by OMA curves 600, 602, starting from an operating point on the longer-wavelength, or "red," edge of the transmission curve, as the heater power increases and the operating point moves towards the resonance peak of the curve (transmission minimum), the OMA (curve 600) initially increases, but then reaches a maximum (at 604) and quickly drops as the swing voltage moves across the transmission minimum. As the heater power is further increased, the operating point moves over to the shorter-wavelength, or "blue," edge of the transmission curve, and the OMA (now along curve 602) increases again, reaching a peak (at 606) and thereafter gradually falls off. As can be seen, for the absorption-free modulator, the OMA is symmetric about the resonance peak of the modulator.

Figure 8:
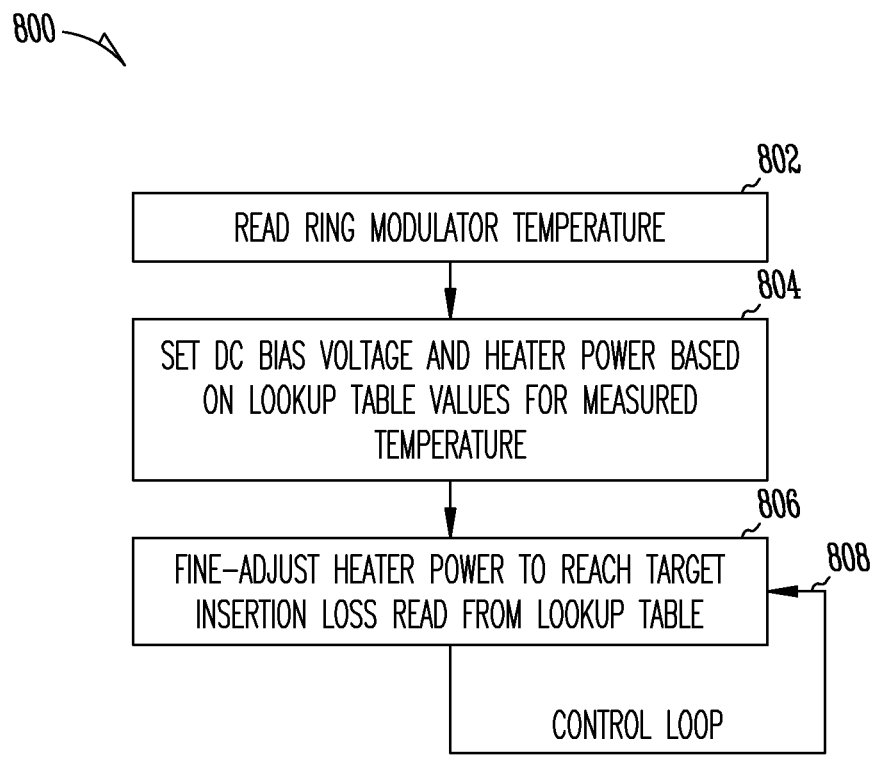
FIG. 8 is a flow chart of a method of operating a hybrid photonic ring modulator with integrated heater, in accordance with various embodiments.

In addition to achieving high tuning efficiency, that is, high OMA for a given voltage swing, it is desirable that the optical modulation is symmetric about the mid-point of the voltage swing, as is reflected in a 50% eye crossing (at which the mid-point between the maximum and minimum optical amplitude coincides with the 0 V mid-point of the swing voltage). In FIG. 8, the eye cross is plotted as a function of heater power for the red and blue edges (curves 608, 610, respectively) of the modulator transmission curves. Intuitively, as the swing voltages passes back and forth across the resonance peak of the modulator, the optical modulation becomes highly asymmetric, as shown by the very low and very high eye crossing levels in curves 608, 610. A 50% eye crossing level is achieve on both edges near, but not exactly at the OMA peaks 604, 606.

Figure 7:
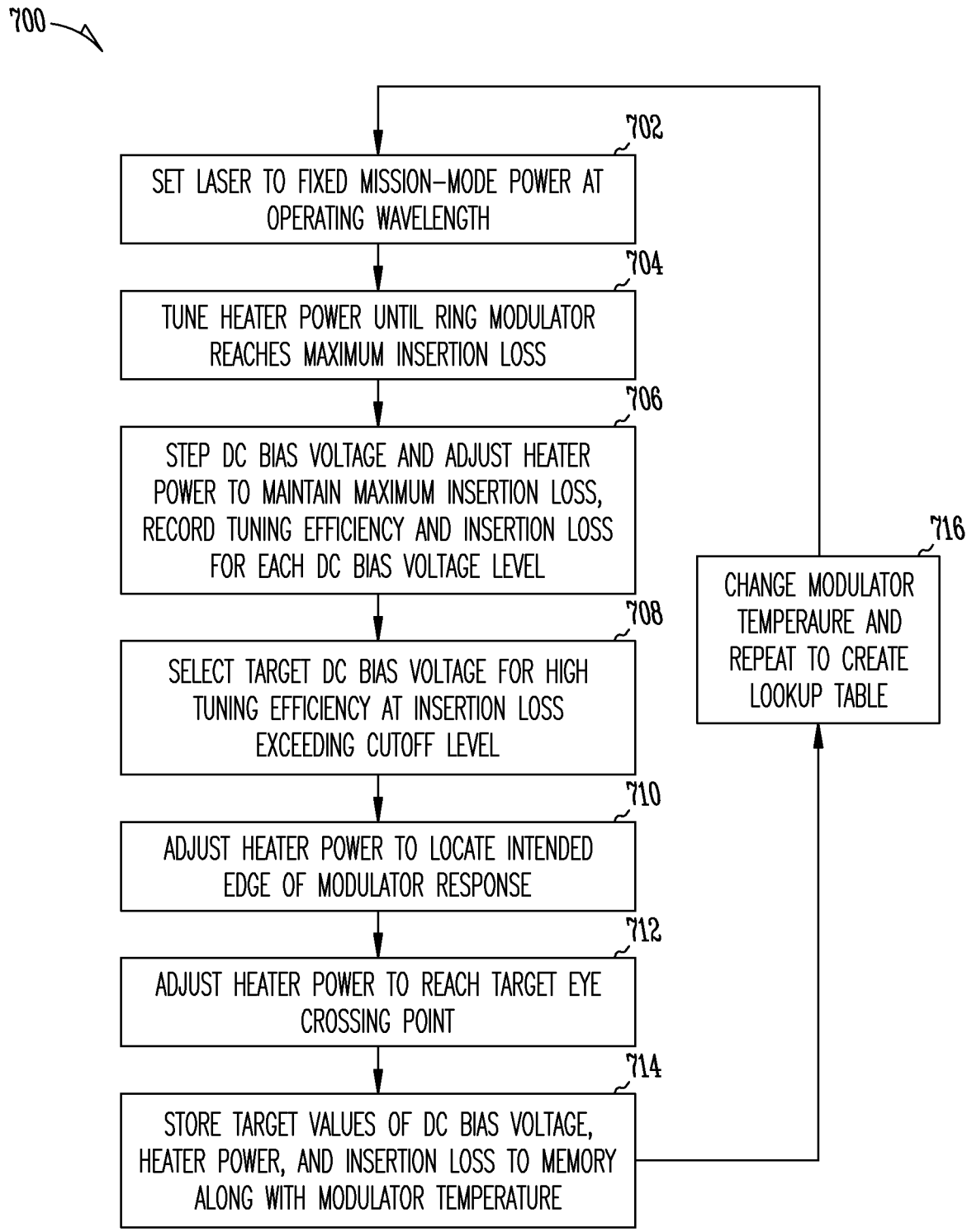
FIG. 7 is a flow chart of a method of calibrating a hybrid photonic ring modulator with integrated heater, in accordance with various embodiments.

FIG. 7 is a flow chart of a method 700 of calibrating a hybrid photonic ring modulator with integrated heater (e.g., ring modulator 100 of FIGS. 1A-1E), in accordance with various embodiments. The method 700 is performed with a laser set at fixed mission-mode power at target operating wavelength (act 702). The power of the heater (e.g., heater 118 of ring modulator 100) is initially tuned until the ring modulator reaches its transmission minimum (maximum insertion loss), corresponding to alignment of the modulator resonance to the wavelength of the laser (act 704). The DC bias voltage across the modulator p-i-n diode is then stepped over a range of voltages, and the heater power simultaneously adjusted to keep the modulator at maximum insertion loss (act 706). At each step, the tuning efficiency of the ring modulator is determined (e.g., in nm/V) and recorded, along with the maximum insertion loss. Within the tested DC bias voltage range, the bias level that keeps the RF voltage swing at the highest tuning efficiency while still keeping the maximum insertion loss above a specified loss cutoff level (e.g., 20 dB) is then selected as the target DC bias voltage (act 708). The loss cutoff level is generally based on a specific device optimization for maximum OMA. As noted, absorption in the ring waveguide will increase, and the maximum insertion loss accordingly decrease, as the ring modulator becomes increasingly overcoupled. The loss cutoff level is set to avoid this high-absorption regime.

Once the target DC bias voltage has been determined, the heater power is adjusted to locate the red or blue (as desired) edge of the modulator response to align it with the operating wavelength (act 710). More specifically, with the laser set at fixed mission-mode power at target wavelength and the DC bias voltage set to the target level, an RF voltage at mission-mode swing level is applied. The heater power is tuned (e.g., gradually increased, beginning at zero heating), and the resulting modulator insertion loss (or transmission) measured to find the intended edge of the modulator response. For the red edge, the insertion loss increases (transmission decreases) with heater power (such that electrical data="1" corresponds to optical data="1"), and for the blue edge, the insertion loss decreases (transmission increases) with heater power (such that electrical data="1" corresponds to optical data="0"). Next, the heater power is stepwise adjusted, and eye crossing and insertion loss are measured (e.g., using taps 420 and monitor photodiodes 422 preceding and following the ring modulator 402, 100) at each step, to find the target eye crossing point (e.g., 50%) (act 712). The determined values for the DC voltage bias, heater power, and target insertion loss of the ring modulator (corresponding to the 50% eye crossing) are then stored to integrated memory (e.g., memory 434, such as flash memory in the microprocessor 432) (act 714). The calibration may be repeated at multiple temperatures (the temperature being changed in act 716, e.g., by placing the PIC including the ring modulator in a controlled-temperature environment) to create a lookup table for the target values of the DC voltage bias, heater power, and target insertion loss over a range of temperatures.

FIG. 8 is a flow chart of a method 800 of operating a hybrid photonic ring modulator with integrated heater (e.g., ring modulator 100 of FIGS. 1A-1E), in accordance with various embodiments. When initializing the ring modulator in mission mode, the temperature of the modulator is read (e.g., using a temperature sensor integrated in the PIC) (act 802). The DC bias voltage and heater power are then set based on the lookup table values for the measured temperature (act 804). Next, the heater power is fine-adjusted based on measurements of the modulator insertion loss (e.g., using taps 420 and monitor photodiodes 422 preceding and following the ring modulator 402, 100) to reach the target insertion loss read from the lookup table (act 806) for the initially measured temperature. During operation of the ring modulator, the heater power may be continuously adjusted in a control loop 808 to compensate for any variation in temperature, e.g., due to data-dependent self-heating (act 808).

In embodiments that do not include heater in the ring modulator, heater tuning in the calibration and operation methods 700, 800 are replaced by tuning the laser wavelength. The lookup table, in this case, lists target values of the DC voltage bias, laser wavelength, and modulator insertion loss over a range of temperatures.

Having described the structure and principles of operation of hybrid photonic ring modulators in conjunction with the example embodiments depicted in the accompanying drawings, the following numbered examples further define various illustrative embodiments.

1. A hybrid photonic ring modulator comprising: a silicon bus waveguide formed in a silicon device layer of a silicon-on-insulator (SOI) substrate; and a ring resonator structure formed above the silicon device layer, the ring resonator structure comprising a p-i-n diode structure of semiconductor compound material and associated electrodes, an active region of the p-i-n diode structure forming a ring waveguide laterally overlapping with the bus waveguide, the ring waveguide and the silicon bus waveguide together forming a vertical directional coupler in an overlap region.

2. The hybrid photonic ring modulator of example 1, wherein the ring waveguide has a diameter between about 5 µm and about 50 µm.

3. The hybrid photonic ring modulator of example 1 or example 2, wherein the semiconductor compound material is a III-V material.

4. The hybrid photonic ring modulator of any of examples 1-3, wherein the active region comprises quantum wells, a photoluminescence wavelength of the quantum wells being detuned from an operating wavelength of light to be modulated by the hybrid photonic ring modulator by at least 100 nm.

5. The hybrid photonic ring modulator of any of examples 1-4, further comprising, placed above the silicon device layer near the p-i-n diode structure, a heater operatively to adjust a resonance wavelength of the ring waveguide.

6. The hybrid photonic ring modulator of example 5, wherein the heater is placed interior to the ring resonator structure.

7. The hybrid photonic ring modulator of example 6, wherein the heater comprises a serpentine metal filament or a metal filament extending along the ring resonator structure over an angle of at least 270° about a center of the ring resonator structure.

8. The hybrid photonic ring modulator of example 5, wherein the heater is placed exterior to the ring resonator structure.

9. The hybrid photonic ring modulator of example 8, wherein the heater extends along the ring resonator structure over an angle of at least 180° about a center of the ring resonator structure.

10. The hybrid photonic ring modulator of any of examples 5-9, further comprising electronic driver circuitry electrically connected to the electrodes to apply a reverse bias voltage and a radio-frequency (RF) voltage swing across the p-i-n diode structure.

11. The hybrid photonic ring modulator of example 10, further comprising memory storing values of the reverse bias voltage and of a power of the heater.

12. A photonic integrated circuit (PIC) comprising: a laser; and a hybrid photonic ring modulator comprising a silicon bus waveguide vertically coupled to a ring-shaped active region of a p-i-n diode structure formed of compound semiconductor material, an optical input of the silicon bus waveguide coupled to an output of the laser, and an optical output of the silicon bus waveguide coupled to an output port of the PIC.

13. The PIC of example 12, further comprising optical taps in the silicon bus waveguide preceding and following the optical ring modulator, and photodiodes at outputs of the optical taps.

14. The PIC of example 12 or example 13, wherein the ring-shaped active region comprises multiple quantum wells, a photoluminescence wavelength of the quantum wells being detuned from an operating wavelength of the laser by at least 100 nm.

15. The PIC of any of examples 12-14, wherein the ring-shaped active region has a diameter between about 5 µm and about 50 µm.

16. The PIC of any of examples 12-15, wherein the hybrid photonic ring modulator further comprises a heater operatively to adjust a resonance wavelength of the ring-shaped active region.

17. The PIC of any of examples 12-16, wherein the PIC implements a multiple-lane photonic transceiver, the hybrid photonic ring modulator and the output port being included in a first transceiver lane, the PIC further including one or more additional lanes each including an additional hybrid photonic ring modulator with an optical output coupled to an additional output port.

18. A method of modulating light guided in a silicon waveguide, the method comprising: vertically coupling the light from the silicon waveguide into an optically active ring waveguide of a compound semiconductor p-i-n diode structure formed above the silicon waveguide; and applying a swing voltage across the p-i-n diode structure to thereby modulate a refractive index in the ring waveguide.

19. The method of example 18, further comprising applying a direct-current (DC) bias voltage across the p-i-n diode structure, a value of the DC bias voltage set to a stored value calibrated to maximize modulator tuning efficiency while exceeding a specified loss cutoff level for a maximum modulator insertion loss.

20. The method of example 19, further comprising heating the ring waveguide, a heater power set to a stored value calibrated to achieve a target crossing point.

Although the inventive subject matter has been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A hybrid photonic ring modulator for modulating light at a target operating wavelength, the photonic ring modulator comprising:
   a silicon bus waveguide formed in a silicon device layer of a silicon-on-insulator (SOI) substrate; and
   a ring resonator structure formed above the silicon device layer, the ring resonator structure comprising a p-i-n diode structure of compound semiconductor material and associated electrodes, an active region of the p-i-n diode structure forming a ring waveguide laterally overlapping with the silicon bus waveguide, the ring waveguide and the silicon bus waveguide together forming a vertical directional coupler in an overlap region;

a heater placed above the silicon device layer near the p-i-n diode structure;

electronic driver circuitry electrically connected to the electrodes to apply a voltage across the p-i-n-diode structure, the voltage including a reverse bias voltage and a radio-frequency (RF) voltage swing; and memory storing a target value of the reverse bias voltage and a target value of a power of the heater, wherein the target value of the reverse bias voltage maximizes a tuning efficiency of shifting, by a change in the applied voltage, a spectral location of a modulator response of the photonic ring modulator, subject to exceeding a specified loss cutoff level for a maximum modulator insertion loss at a resonance wavelength of the modulator response, and wherein the target value of the power of the heater optimizes an offset between the resonance wavelength of the modulator response at the target value of the reverse bias voltage and the target operating wavelength to achieve a target insertion loss at the target operating wavelength.

2. The hybrid photonic ring modulator of claim 1, wherein the ring waveguide a diameter between about 5 μm and about 50 μm.

3. The hybrid photonic ring modulator of claim 1, wherein the compound semiconductor material is a III-V material.

4. The hybrid photonic ring modulator of claim 1, wherein the active region comprises quantum wells, a photoluminescence wavelength of the quantum wells being detuned from the target operating wavelength by at least 100 nm.

5. The hybrid photonic ring modulator of claim 1, wherein the heater is placed interior to the ring resonator structure.

6. The hybrid photonic ring modulator of claim 5, wherein the heater comprises a serpentine metal filament or a metal filament extending along the ring resonator structure over an angle of at least 270° about a center of the ring resonator structure.

7. The hybrid photonic ring modulator of claim 1, wherein the heater is placed exterior to the ring resonator structure.

8. The hybrid photonic ring modulator of claim 7, wherein the heater extends along the ring resonator structure over an angle of at least 180° about a center of the ring resonator structure.

9. The hybrid photonic ring modulator of claim 1, wherein the memory stores multiple target values of the reverse bias voltage and the power of the heater, the multiple target values being associated with multiple respective temperatures.

10. A photonic integrated circuit (PIC) comprising:
a laser to emit light at an operating wavelength; and
a hybrid photonic ring modulator comprising:
a silicon bus waveguide vertically coupled to a ring-shaped active region of a p-i-n diode structure formed of compound semiconductor material, an optical input of the silicon bus waveguide coupled to an output of the laser, and an optical output of the silicon bus waveguide coupled to an output port of the PIC;
a heater placed near the p-i-n diode structure;
electrodes and associated electronic driver circuitry configured to apply a voltage across the p-i-n-diode structure, the voltage including a reverse bias voltage and a radio-frequency (RF) voltage swing; and
memory storing a target value of the reverse bias voltage and a target value of a power of the heater,
wherein the target value of the reverse bias voltage maximizes a tuning efficiency of shifting, by a change in the applied voltage, a spectral location of a modulator response of the photonic ring modulator, subject to exceeding a specified loss cutoff level for a maximum modulator insertion loss at a resonance wavelength of the modulator response,
wherein the target value of the heater power optimizes an offset between the operating wavelength and the resonance wavelength of the modulator response at the target value of the reverse bias voltage to achieve a target insertion loss at the operating wavelength.

11. The PIC of claim 10, further comprising optical taps in the silicon bus waveguide preceding and following the hybrid photonic ring modulator, and photodiodes at outputs of the optical taps.

12. The PIC of claim 10, wherein the ring-shaped active region comprises multiple quantum wells, a photoluminescence wavelength of the quantum wells being detuned from the operating wavelength of the laser by at least 100 nm.

13. The PIC of claim 10, wherein the ring-shaped active region has a diameter between about 5 μm and about 50 μm.

14. The PIC of claim 10, wherein the PIC implements a multiple-lane photonic transceiver, the hybrid photonic ring modulator and the output port being included in a first transceiver lane, the PIC further including one or more additional lanes each including an additional hybrid photonic ring modulator with an optical output coupled to an additional output port.

15. A method of modulating light guided in a silicon waveguide, the method comprising:
vertically coupling the light at an operating wavelength from the silicon waveguide into an optically active ring waveguide of a compound semiconductor p-i-n diode structure formed above the silicon waveguide, the ring waveguide having an associated resonance wavelength;
applying a voltage across the p-i-n diode structure to thereby modulate a refractive index in the ring waveguide, the voltage including a direct-current (DC) reverse bias voltage and a swing voltage; and
heating the p-i-n diode structure,
wherein the DC reverse bias voltage is set to a stored value that maximizes a modulator tuning efficiency of shifting, by a change in the applied voltage, the resonance wavelength, subject to exceeding a specified loss cutoff level for a maximum modulator insertion loss associated with the resonance wavelength, and
wherein a power of the heater is set to a value that optimizes an offset between the operating wavelength and the resonance wavelength at the set value of the DC reverse bias voltage to achieve a target insertion loss at the operating wavelength.

16. The method of claim 15, wherein the target insertion loss is associated with a target crossing point.

* * * * *